(12) United States Patent
Uno

(10) Patent No.: US 9,360,330 B2
(45) Date of Patent: Jun. 7, 2016

(54) INFORMATION PROCESSING SYSTEM FOR VEHICLE

(75) Inventor: Satoshi Uno, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/498,412

(22) PCT Filed: May 23, 2011

(86) PCT No.: PCT/JP2011/061755
§ 371 (c)(1),
(2), (4) Date: Mar. 27, 2012

(87) PCT Pub. No.: WO2012/160636
PCT Pub. Date: Nov. 29, 2012

(65) Prior Publication Data
US 2015/0149071 A1 May 28, 2015

(51) Int. Cl.
*G01C 21/12* (2006.01)
*G01S 19/48* (2010.01)
(Continued)

(52) U.S. Cl.
CPC ............... *G01C 21/34* (2013.01); *G01C 21/28* (2013.01); *G08G 1/09626* (2013.01); *G08G 1/096775* (2013.01); *G08G 1/096783* (2013.01)

(58) Field of Classification Search
USPC ...................................... 701/408; 342/357.31
See application file for complete search history.

(56) References Cited

U.S. PATENT DOCUMENTS 3,872,283 A * 3/1975 Smith et al. .................. 701/408
5,521,823 A 5/1996 Akita et al.
(Continued)

FOREIGN PATENT DOCUMENTS

DE 201 14 418 10/2001
DE 103 15 047 10/2004
(Continued)

OTHER PUBLICATIONS

U.S. Appl. No. 13/579,524, filed Aug. 17, 2012.
(Continued)

*Primary Examiner* — Thomas G Black
*Assistant Examiner* — Tyler Paige
(74) *Attorney, Agent, or Firm* — Finnegan, Henderson, Farabow, Garrett & Dunner, LLP

(57) ABSTRACT

Disclosed is an information processing system for a vehicle that calculates a recommended position of a driving operation in a predetermined area in which the driving operation is supported. The information processing system for a vehicle includes storage means for storing driving operation information of a driver and position information of the vehicle in each predetermined area so as to be associated with each other. The information processing system for a vehicle specifies a driving operation pattern of the predetermined area considering the state of the driving operation over the inside and outside of the predetermined area and determines the recommended position of the driving operation in the predetermined area according to the specified driving operation pattern, on the basis of the information stored in the storage means. According to this structure, even when some driving operations of a driving operation group included in the driving operation pattern are performed outside the area, it is possible to specify the driving operation pattern, determine the recommended position of the driving operation, and perform high-accuracy driving support suitable for the driver.

8 Claims, 26 Drawing Sheets

(51) Int. Cl.
*G01C 21/34* (2006.01)
*G08G 1/0962* (2006.01)
*G08G 1/0967* (2006.01)
*G01C 21/28* (2006.01)

(56) References Cited

U.S. PATENT DOCUMENTS

| | | | |
|---|---|---|---|
| 5,661,650 A * | 8/1997 | Sekine et al. | 701/82 |
| 6,115,668 A * | 9/2000 | Kaneko et al. | 701/454 |
| 6,161,072 A * | 12/2000 | Clapper | 701/93 |
| 6,252,544 B1 * | 6/2001 | Hoffberg | 342/357.31 |
| 6,268,825 B1 | 7/2001 | Okada | |
| 6,549,145 B2 * | 4/2003 | Hsu et al. | 340/905 |
| 6,549,841 B1 | 4/2003 | AxElsson | |
| 6,631,322 B1 * | 10/2003 | Arthur et al. | 701/454 |
| 6,847,892 B2 * | 1/2005 | Zhou et al. | 701/408 |
| 6,993,421 B2 * | 1/2006 | Pillar et al. | 701/29.4 |
| 7,522,990 B2 | 4/2009 | Daum et al. | |
| 7,841,673 B2 | 11/2010 | Szczerba et al. | |
| 7,849,944 B2 * | 12/2010 | DeVault | 180/65.29 |
| 8,019,501 B2 * | 9/2011 | Breed | 701/31.9 |
| 8,073,605 B2 | 12/2011 | Naik et al. | |
| 8,185,296 B2 | 5/2012 | Yokoyama et al. | |
| 2006/0290202 A1 | 12/2006 | Shibata et al. | |
| 2007/0027583 A1 * | 2/2007 | Tamir et al. | 701/1 |
| 2007/0265759 A1 * | 11/2007 | Salinas et al. | 701/93 |
| 2008/0243312 A1 | 10/2008 | Nakamura et al. | |
| 2009/0005929 A1 | 1/2009 | Nakao et al. | |
| 2009/0076698 A1 | 3/2009 | Yokoyama et al. | |
| 2009/0132139 A1 | 5/2009 | Takeuchi et al. | |
| 2009/0319176 A1 * | 12/2009 | Kudoh et al. | 701/207 |
| 2010/0004839 A1 * | 1/2010 | Yokoyama et al. | 701/70 |
| 2010/0063722 A1 * | 3/2010 | Yoshikawa | 701/201 |
| 2010/0112529 A1 * | 5/2010 | Miura | 434/65 |
| 2013/0038127 A1 | 2/2013 | King et al. | |
| 2013/0204460 A1 | 8/2013 | Uno | |

FOREIGN PATENT DOCUMENTS

| | | |
|---|---|---|
| DE | 10 2008 019 174 | 10/2009 |
| JP | 2004-108777 | 4/2004 |
| JP | 2005-7932 | 1/2005 |
| JP | 2005-174314 | 6/2005 |
| JP | 2005-297817 | 10/2005 |
| JP | 2006-347531 | 12/2006 |
| JP | 2007-8203 | 1/2007 |
| JP | 2007-008327 | 1/2007 |
| JP | 2007-196851 | 8/2007 |
| JP | 2008-74337 | 4/2008 |
| JP | 2008-275575 | 11/2008 |
| JP | 2009-179168 | 8/2009 |
| JP | 2009-244167 | 10/2009 |
| WO | WO 2009/059766 | 5/2009 |
| WO | WO 2010/081836 | 7/2010 |
| WO | WO 2012/095964 | 7/2012 |

OTHER PUBLICATIONS

U.S. Appl. No. 13/879,524, filed Apr. 15, 2012.
U.S. Appl. No. 13/976,752, filed Jun. 27, 2013.
U.S. Appl. No. 14/000,487, filed Aug. 20, 2013.
Office Action dated Aug. 5, 2015, issued in U.S. Appl. No. 13/879,524 (11 pages).
Notice of Allowance and Notice of Allowability dated Jan. 13, 2016 in U.S. Appl. No. 13/879,524.

* cited by examiner (a)

| PEDAL STATE<br>DETERMINATION RESULT | ACCELERATOR ON STATE | BRAKE ON STATE | NO PEDAL OPERATION |
|---|---|---|---|
| ENTRANCE BEFORE APPROACH | ○ (DETERMINED) | △ (NON-PREFERENCE) | △ (NON-PREFERENCE) |
| ENTRANCE DURING APPROACH | × (NO) | ○ (PREFERENCE) | ○ (PREFERENCE) |

*Fig.18*

| PEDAL OPERATION / DETERMINATION RESULT WHEN VEHICLE ENTERS AREA | ACCELERATOR ON | BRAKE ON | ACCELERATOR OFF OR BRAKE OFF |
|---|---|---|---|
| ENTRANCE BEFORE APPROACH | ○ (DETERMINATION IS MAINTAINED) | | |
| ENTRANCE DURING APPROACH | × (DETERMINATION IS CHANGED) | ○ (DETERMINATION IS MAINTAINED) | ○ (DETERMINATION IS MAINTAINED) |

INFORMATION PROCESSING SYSTEM FOR VEHICLE

CROSS-REFERENCE TO RELATED APPLICATIONS

This application is a national phase application of International Application No. PCT/JP2011/061755, filed May 23, 2011, the contents of which are incorporated herein by reference.

TECHNICAL FIELD

The present invention relates to an information processing system for a vehicle that calculates a recommended position of a driving operation in a predetermined area in which a driving operation is supported.

BACKGROUND ART

Various kinds of techniques for supporting the driver of the vehicle have been developed. For example, Patent Literature 1 discloses a driving support device which specifies the stop position of the vehicle in advance on the basis of map information or traffic information, specifies a coasting start position where coasting to the stop position starts on the basis of the specified stop position and a distance to travel by coasting, and notifies, for example, the coasting start position (accelerator OFF) or a braking start position (brake ON) to the driver such that the driver drives the vehicle with low power consumption.

CITATION LIST

Patent Literature

[Patent Document 1] Japanese Unexamined Patent Application Publication No. 2009-244167

SUMMARY OF INVENTION

Technical Problem

The driving support device disclosed in Patent Document 1 uniformly specifies the stop position on the basis of the map information or the traffic information and uniformly supports the driving of the driver on the basis of the uniform stop position. However, the stop position is different for each vehicle (furthermore, for each driver of the vehicle) and the time when the driver steps off the accelerator and steps on the brake in a deceleration and stop operation is different for each driver. In addition, the time when the driver steps off the accelerator and steps on the brake varies depending on, for example, surrounding traffic conditions or the shape of the road. Therefore, when driving is uniformly supported regardless of various conditions related to the driver or the traveling of the vehicle, the driver feels the driving support function to be complicated. In addition, when a series of driving operations is performed outside a support area during deceleration and stop, the driving operations are excluded from a support target and the driving support is not performed.

An object of the invention is to provide an information processing system for a vehicle which is capable of performing high-accuracy driving support suitable for the driver.

Solution to Problem

According to an aspect of the invention, there is provided an information processing system for a vehicle that calculates a recommended position of a driving operation in a predetermined area in which the driving operation is supported. The information processing system for a vehicle includes: storage means for storing driving operation information of a driver and position information of the vehicle in each predetermined area so as to be associated with each other; pattern specifying means for specifying a driving operation pattern of the predetermined area on the basis of the information stored in the storage means; and recommended position determining means for determining the recommended position of the driving operation in the predetermined area according to the driving operation pattern specified by the pattern specifying means, on the basis of the information stored in the storage means. The pattern specifying means specifies the driving operation pattern, considering the state of the driving operation over the inside and outside of the predetermined area.

Since, for example, the shape of the road is changed in each predetermined area, which is a support target, the driving operation pattern of the driver is also changed. In addition, even in the same area, the driving operation pattern of the driver is changed since the drivers have different habits in the driving operation. For example, even in the same area, when surrounding traffic conditions are changed (disturbance), the driving operation pattern of the driver is changed according to the surrounding traffic conditions. Therefore, it is possible to perform high-accuracy driving support suitable for the driver by acquiring the driving operation pattern of the driver in each area and performing the driving support corresponding to the driving operation pattern. In particular, in some cases, some driving operations of a driving operation group included in the general driving operation pattern are performed outside the area due to, for example, the driving operation habit of the driver, disturbance during the traveling of the vehicle, and the shape of the road. Even when the driving operation is performed outside the area, the driving operation is set as a driving support target and a driving support opportunity increases. Therefore, it is possible to perform a high-accuracy driving support suitable for the driver.

The information processing system for a vehicle includes the storage means for storing the driving operation information (for example, accelerator operation information and brake operation information) of the driver and the position information of the vehicle in each predetermined area so as to be associated with each other. In the information processing system for a vehicle, the pattern specifying means specifies the driving operation pattern of the driver in the predetermined area on the basis of the information stored in the storage means and the recommended position determining means determines the recommended position of the driving operation in the predetermined area according to the driving operation pattern. In particular, the pattern specifying means specifies the driving operation pattern, considering the state of the driving operation over the inside and outside of the predetermined area. As such, in the information processing system for a vehicle, the driving operation pattern is specified considering the state of the driving operation over the inside and outside of the predetermined area. Therefore, even when some driving operations in the driving operation group included in the driving operation pattern are performed outside the area, it is possible to specify the driving operation pattern, determine the recommended position of the driving operation, and perform a high-accuracy driving support suitable for the driver. That is, even when some driving operations of the driving operation pattern are performed outside the area due to, for example, the driving operation habit of the driver, disturbance during the traveling of the vehicle, and the shape of the road, it is possible to learn the driving operation pattern as a driving support target and driving support opportunity increases.

The state of the driving operation includes a state in which the driver performs the driving operation and a state in which the driver does not perform the driving operation (for example, a state in which an accelerator operation is not performed and a state in which a brake operation is not performed).

In the information processing system for a vehicle according to the invention, the pattern specifying means specifies the driving operation pattern, considering the state of the driving operation when the vehicle enters the predetermined area. In the information processing system for a vehicle, since the driving operation pattern is specified considering the state of the driving operation when the vehicle enters the predetermined area, it is possible to specify the driving operation pattern and determine the recommended position of the driving operation even when some driving operations in the driving operation group included in the driving operation pattern are performed before the vehicle enters the area (even when the vehicle enters the area in the middle of the driving operation pattern).

In the information processing system for a vehicle according to the invention, the pattern specifying means specifies the driving operation pattern, considering the state of the driving operation when the vehicle exits from the predetermined area. In the information processing system for a vehicle, since the driving operation pattern is specified considering the driving operation state when the vehicle exits from the area, it is possible to specify the driving operation pattern and determine the recommended position of the driving operation even when some driving operations in the driving operation group included in the driving operation pattern are not performed in the area (even when the vehicle exits from the area in the middle of the driving operation pattern).

In the information processing system for a vehicle according to the invention, the pattern specifying means specifies the driving operation pattern as an exceptional operation pattern when some driving operations in a driving operation group included in a general driving operation pattern including deceleration or acceleration is not performed in the predetermined area. When the pattern specifying means specifies the driving operation pattern as the exceptional operation pattern, the recommended position determining means determines the recommended position of the driving operation in the predetermined area according to the exceptional operation pattern.

In the information processing system for a vehicle, the pattern specifying means specifies the driving operation pattern as the exceptional operation pattern when some driving operations in the driving operation group included in the general driving operation pattern including deceleration or acceleration are not performed in the predetermined area. In the information processing system for a vehicle, in the case of the exceptional operation pattern, the recommended position determining means determines the recommended position of the driving operation as the exceptional operation pattern in the predetermined area. As such, in the information processing system for a vehicle, the exceptional operation pattern other than the general driving operation pattern is set. Therefore, even when some driving operations in the driving operation group included in the driving operation pattern are performed outside the area, it is possible to set the exceptional operation pattern as a driving support target.

Advantageous Effects of Invention

According to the invention, a driving operation pattern is specified considering the state of a driving operation over the inside and outside of a predetermined area. Therefore, even when some driving operations in a driving operation group included in the driving operation pattern are performed outside the area, it is possible to specify the driving operation pattern, determine the recommended position of the driving operation, and perform a high-accuracy driving support suitable for the driver.

BRIEF DESCRIPTION OF DRAWINGS

FIG. 5(a) shows a case in which all driving operations of a decelerated approach are performed in an area and FIG. 5(b) shows a case in which some driving operations of the decelerated approach are performed outside the area.

FIG. 6(a) shows a case in which a vehicle enters the area before the decelerated approach and FIG. 6(b) shows a case in which the vehicle enters the area during the decelerated approach.

FIG. 7(a) shows a general flat road on which all of the driving operations of the decelerated approach are performed in the area and FIG. 7(b) shows a downhill road on which some driving operations of the decelerated approach are performed outside the area.

FIG. 8(a) shows a case in which the effective distance of the area is short and FIG. 8(b) shows a case in which adjacent areas overlap each other.

FIG. 14(a) shows a case in which the distribution of actions before approach of the rush cruise pattern is in a check section for an action before approach and FIG. 14(b) shows a case in which the distribution of actions before approach of the rush cruise pattern is after the check section for the action before approach.

FIG. 17 is a diagram illustrating a decision table used in a determining and predicting process during entrance to an area according to this embodiment.

FIG. 18 is a diagram illustrating a decision table used in a determining and predicting process after entrance to an area according to this embodiment.

DESCRIPTION OF EMBODIMENTS

Figure 1:
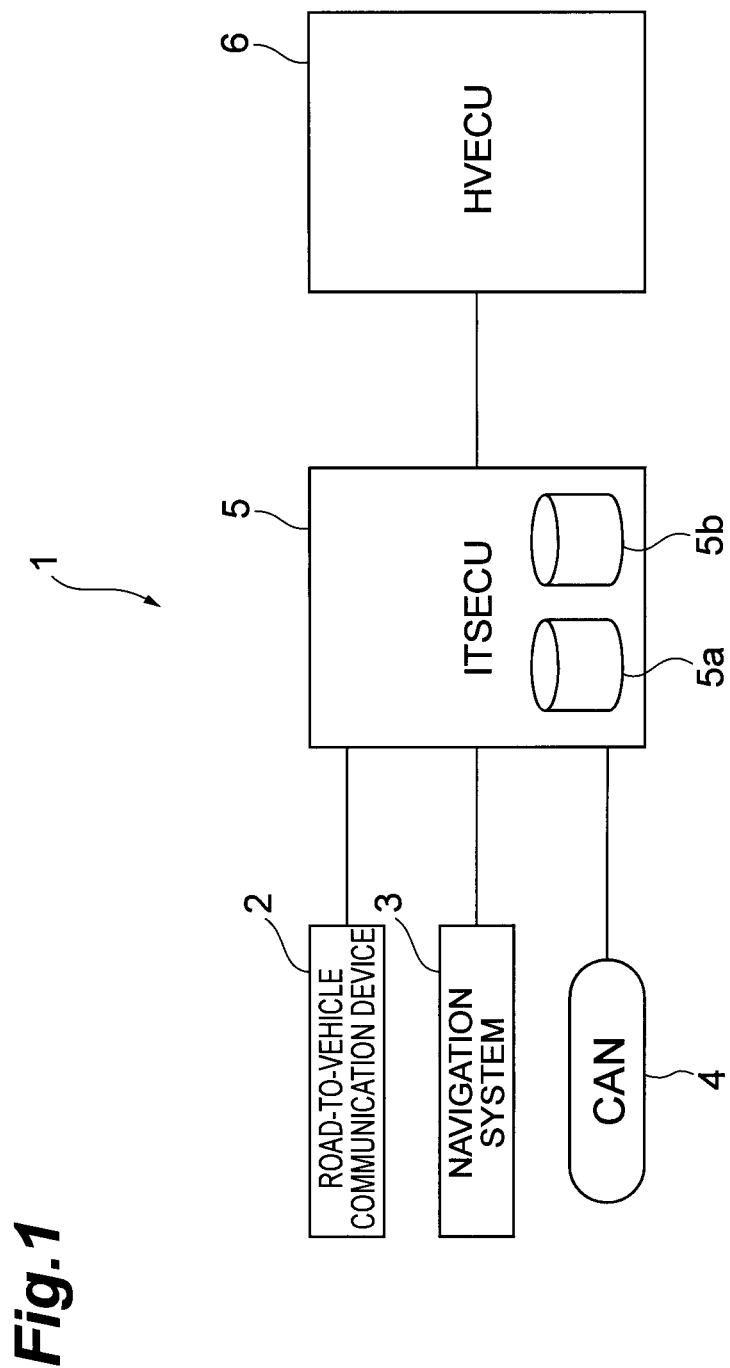
FIG. 1 is a diagram illustrating the structure of an information processing system for a vehicle according to an embodiment.

Hereinafter, an information processing system for a vehicle according to an embodiment of the invention will be described with reference to the accompanying drawings. In the drawings, the same or equivalent components are denoted by the same reference numerals and the description thereof will not be repeated.

In this embodiment, the invention is applied to an information processing system for a vehicle which is provided in a hybrid vehicle having an eco-driving support function. In the information processing system for a vehicle according to this embodiment, a function for performing an eco-driving support suitable for the driver of each vehicle when the vehicle decelerated and stopped (assist the driver of the vehicle to drive the vehicle with low fuel consumption) is given as one of the functions of ITS [Intelligent Transport Systems]. In this embodiment, the function will be described in detail. As a precondition, deceleration is to reduce the speed in response to a foot brake operation. It is thought that there is still room for improvement of fuel efficiency, considering the speed is reduced by the foot brake operation.

As an eco-driving support technique, a technique cooperating with an infrastructure is considered. For example, eco-driving support is performed at the intersection where the infrastructure (for example, a beacon) is installed. However, it is impossible to install the infrastructure at all intersections where the vehicle is likely to be stopped. Therefore, in the eco-driving support technique cooperating with the infrastructure, it is impossible to perform the eco-driving support at all positions where the vehicle is stopped. Therefore, in the information processing system for a vehicle according to this embodiment, candidate areas of a support area are set by learning, a support area in which the vehicle is decelerated and stopped every time (the area in which the repeatability of the vehicle being decelerated and stopped in the usual traveling route is high) is specified from the candidate areas by learning, a deceleration action peculiar to the vehicle is extracted from the specified support area, and eco-driving support is performed using the support area and the deceleration action (deceleration prediction information: recommended position information for performing each operation during deceleration).

Figure 2:
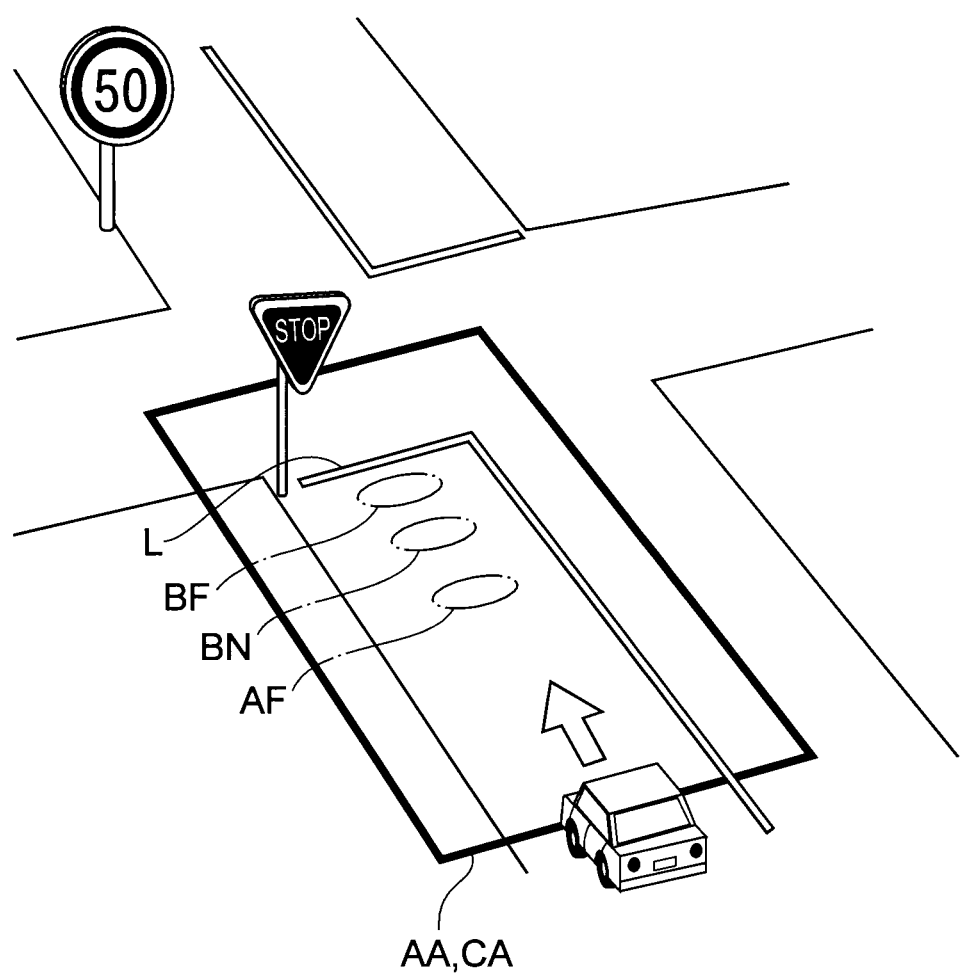
FIG. 2 is a diagram illustrating an example of a candidate area (support area) according to this embodiment.

An information processing system 1 for a vehicle according to this embodiment will be described with reference to FIGS. 1 and 2. FIG. 1 is a diagram illustrating the structure of the information processing system for a vehicle. FIG. 2 is a diagram illustrating an example of the candidate area (support area).

The information processing system 1 for a vehicle performs a candidate area learning process for setting a support candidate area, a deceleration action learning process for learning a deceleration action in each candidate area and extracting the deceleration prediction information, a deceleration predicting process for outputting the deceleration prediction information (prediction information) of each support area, and an eco-driving support process using the deceleration prediction information. In order to perform the processes, the information processing system 1 for a vehicle includes a road-to-vehicle communication device 2, a navigation system 3, a CAN [Controller Area Network] 4, an ITSECU [Electronic Control Unit] 5, an HV [Hybrid Vehicle] ECU 6, as shown in FIG. 1.

In the candidate area learning process or the deceleration action learning process, the information of each vehicle is stored in a database. However, means for recognizing the driver may be provided and the information of each recognized driver may be stored in the database. In addition, when the driver of the vehicle is specified, the information of the specified driver is stored in the database. For example, a method of specifying the driver from, for example, the movement or traveling route of the vehicle is used as a method of specifying the driver.

The road-to-vehicle communication device 2 performs road-to-vehicle communication with, for example, a beacon, which is an infrastructure. When the vehicle enters a communication area of the infrastructure, the road-to-vehicle communication device 2 receives information from the infrastructure and transmits the received information to the ITSECU 5. Examples of the information required for the ITSECU 5 among the information items from the infrastructure include the geometric line form of the road to an intersection, which is a service target, the information of the intersection (for example, the shape information or position information of the intersection and the information of a stop line), and signal cycle information.

The navigation system 3 detects the current position of the vehicle and performs route guidance to the destination. In particular, when detecting the current position of the vehicle on the basis of signals received by a GPS [Global Positioning System] at a predetermined time interval, the navigation system 3 transmits current position information to the ITSECU 5 or the HVECU 6. In addition, the navigation system 3 transmits map information required by the ITSECU 5 among data stored in a map database to the ITSECU 5. The information required by the ITSECU 5 is, for example, the position information of a place where a vehicle stop is specified in law and is the position information of, for example, a temporary stop, a crossing, and a traffic signal. In the case of a vehicle without a navigation system, the vehicle may include a GPS in order to acquire the current position of the vehicle.

The CAN 4 is a LAN in the vehicle and is used to transmit or receive information in the vehicle. Examples of the information required by the ITSECU 5 among the information items flowing through the CAN 4 include accelerator operation information, brake operation information, brake pressure information, vehicle speed information, and acceleration/deceleration information. The ITSECU 5 has a communication interface of the CAN 4.

The ITSECU 5 is an electronic control unit including, for example, a CPU [Central Processing Unit], a ROM [Read Only Memory], and a RAM [Random Access Memory] and implements various functions of the intelligent transport system. In this embodiment, among the functions of the ITSECU 5, only a function of implementing the eco-driving support suitable for the driver of each vehicle when the vehicle is decelerated and stopped (in particular, candidate area learning, deceleration action learning, and deceleration prediction) will be described. Furthermore, in this embodiment, the processes of the ITSECU 5 correspond to pattern specifying means and recommended position determining means in the claims and the database 5b corresponds to storage means in the claims.

Next, the candidate area learning will be described. In the candidate area learning, a section in which a deceleration operation is frequently performed in the traveling route of the vehicle (furthermore, the driver of the vehicle) is extracted as the candidate area. As the learning method, there are two methods. One of the methods is to extract the candidate area on the basis of the position (for example, a temporary stop, a traffic signal (red signal), and a crossing where a vehicle stop is specified in law) where the vehicle is predicted to be decelerated and stopped in the traveling route of the vehicle. The other method is to store the pedal operation information of the driver and the position information of the vehicle when the driver drives the vehicle so as to be associated with each other and extract the section in which the driver of the vehicle frequently performs the deceleration operation in practice as the candidate area on the basis of the stored information.

The candidate area learning process of the first method will be described in detail. The ITSECU 5 receives map information (in particular, the information of the position, such as a temporary stop, a crossing, and a traffic signal, where the vehicle is predicted to be stopped) about the road on which the vehicle travels from the navigation system 3 (map database) while the vehicle travels on the road. Then, the ITSECU 5 determines whether the vehicle passes through the position where the vehicle is predicted to be stopped (at the position, it is predicted that the deceleration operation is frequently performed in a section before the position) whenever the current position information is received from the navigation system 3. When the vehicle passes through the position where the vehicle is predicted to be stopped, the ITSECU 5 sets the candidate area on the basis of the information of the position. The position where the vehicle is predicted to be stopped may include a position which is registered as the destination or the point of interest by the navigation system 3, such as the home or the company.

Next, the candidate area learning process of the second method will be described in detail. The ITSECU 5 stores the accelerator operation information and the brake operation information received from the CAN 4 and the current position information received from the navigation system 3 in the database 5a so as to be associated with each other at a predetermined time interval or at intervals of a predetermined traveling distance during the traveling of the vehicle. When data is stored in the database 5a, the ITSECU 5 extracts a deceleration action on the basis of the accelerator operation information and the brake operation information stored in the database 5a. The deceleration action is an operation which is performed in the order of stepping-off the accelerator, stepping-on/stepping-off (repeatedly) the brake, and stepping-on the accelerator. Then, the ITSECU 5 counts the number of times the vehicle passes through the same route, counts the number of deceleration actions when the deceleration action is extracted in the same section, and divides the number of deceleration actions by the number of passages to calculate the rate of the deceleration operation. In addition, the ITSECU 5 sets the section in which the number of passages is equal to or greater than a predetermined value (for example, 5 times or more, or 10 times or more) and the rate of the deceleration action is equal to or greater than a threshold value (for example, 80% or more, or 90% or more) as the candidate area. As the method of determining the section in which the deceleration action is frequently performed, other methods may be used. For example, the brake pressure which is equal to or greater than a predetermined value whenever the brake operation is performed may be used to determine the section in which the deceleration action is frequently performed.

When setting the candidate area, the ITSECU 5 sets an area which has a width including all lanes in the traveling direction of the vehicle and has a predetermined distance in the length direction as the candidate area. The predetermined distance is sufficiently long to include the deceleration action of the driver to stop the vehicle. For example, as shown in FIG. 2, at the intersection having a temporary stop line L, a section from the center position of the intersection in front of the temporary stop line L to a predetermined position (position that is hundreds of meters ahead) in front of the temporary stop line L is set as a candidate area CA. The length of the section is a sufficiently long distance to extract the deceleration action when the vehicle is stopped. For example, the length of the section is set using the remaining distance variable of the navigation system 3. In addition, the traveling distance of each vehicle during the deceleration action of the vehicle may be learned and utilized to set the appropriate range of each vehicle (furthermore, each driver).

The first method requires map data, but the second method does not require map data. Therefore, when the first method is used, map data is needed to support the driving of the driver. When the second method is used, it is possible to perform driving support without using map data.

Next, the deceleration action learning will be described. In the deceleration action learning, various kinds of information are stored whenever the vehicle passes through the candidate area, a deceleration action and an acceleration action are classified in the candidate area from the stored information, and an effective deceleration action (decelerated approach to a deceleration target) when the vehicle is stopped in the candidate area is extracted. When the decelerated approach is extracted, a traveling pattern in the area is determined and deceleration prediction information for each traveling pattern is generated. In the deceleration action learning, when the deceleration prediction information is generated, traveling patterns (driving operation patterns) before, during, and after the extracted decelerated approach are specified, the deceleration prediction information is generated for each traveling pattern before approach, and reliability (ranks A to D) is set to each traveling pattern. In particular, in the deceleration action learning, a pattern in which the vehicle enters the area during approach without an operation before approach is extracted as an exceptional pattern, the deceleration prediction information of the exceptional pattern is generated, and the reliability (exceptional rank) of the exceptional pattern is set. As described above, the deceleration action is performed in the order of stepping-off the accelerator, stepping-on/stepping-off (repeatedly) the brake, and stepping-on the accelerator. The acceleration action is performed in the order of stepping-off the accelerator and stepping-on the accelerator (repeatedly).

The deceleration prediction information is information about the recommended position of each driving operation during the decelerated approach and includes a deceleration start position (the position of an operation of stepping off the accelerator) AF, a brake start position (the position of an operation of stepping on the brake) BN, and a stop target position (the position of an operation of stepping off the brake) BF in each support area AA (candidate area CA), as shown in FIG. 2. The deceleration prediction information is generated for each area and is also generated for each traveling pattern or each exceptional pattern before approach to each area.

Figure 3:
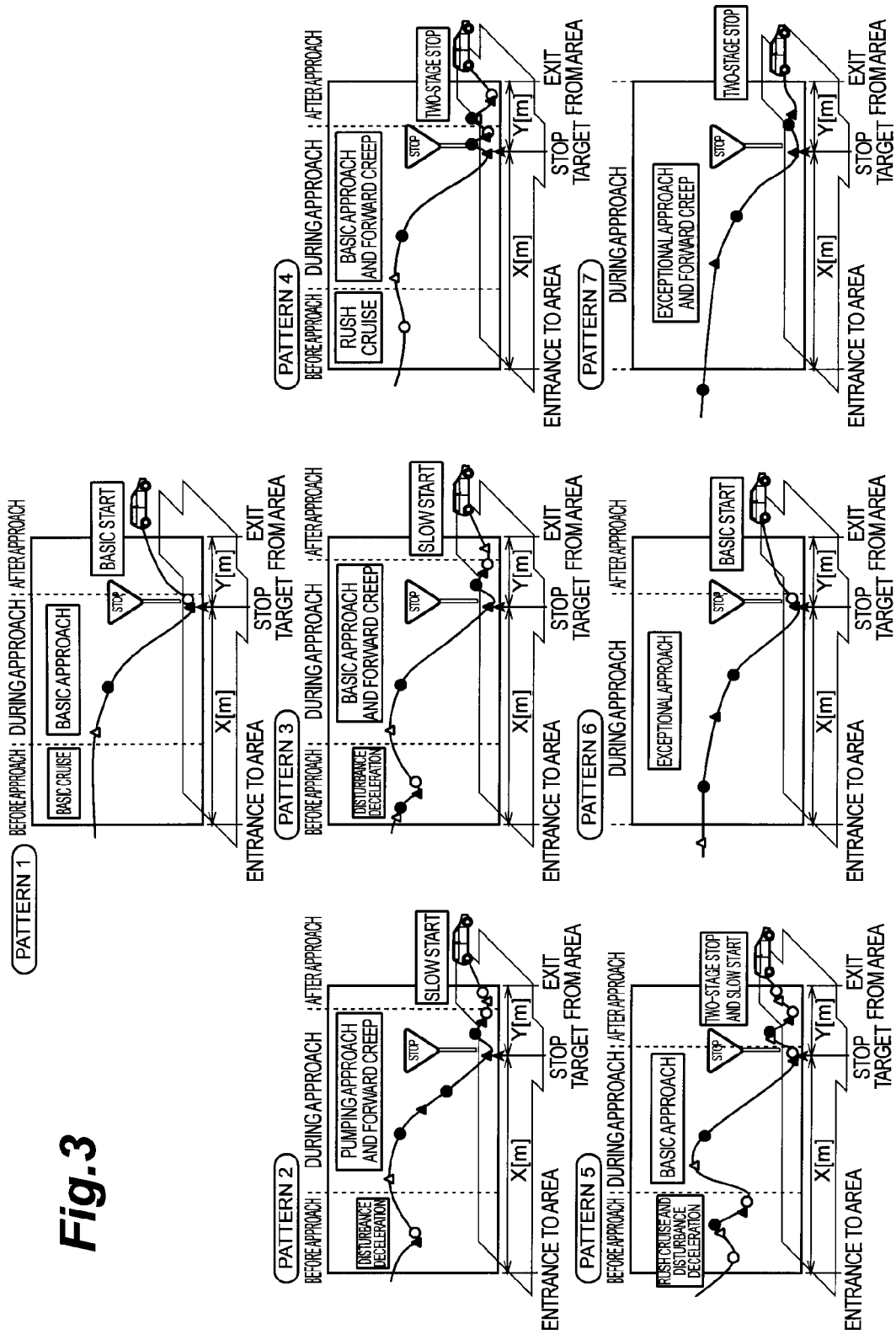
FIG. 3 is a diagram illustrating an example of a traveling pattern according to this embodiment.
Figure 4:
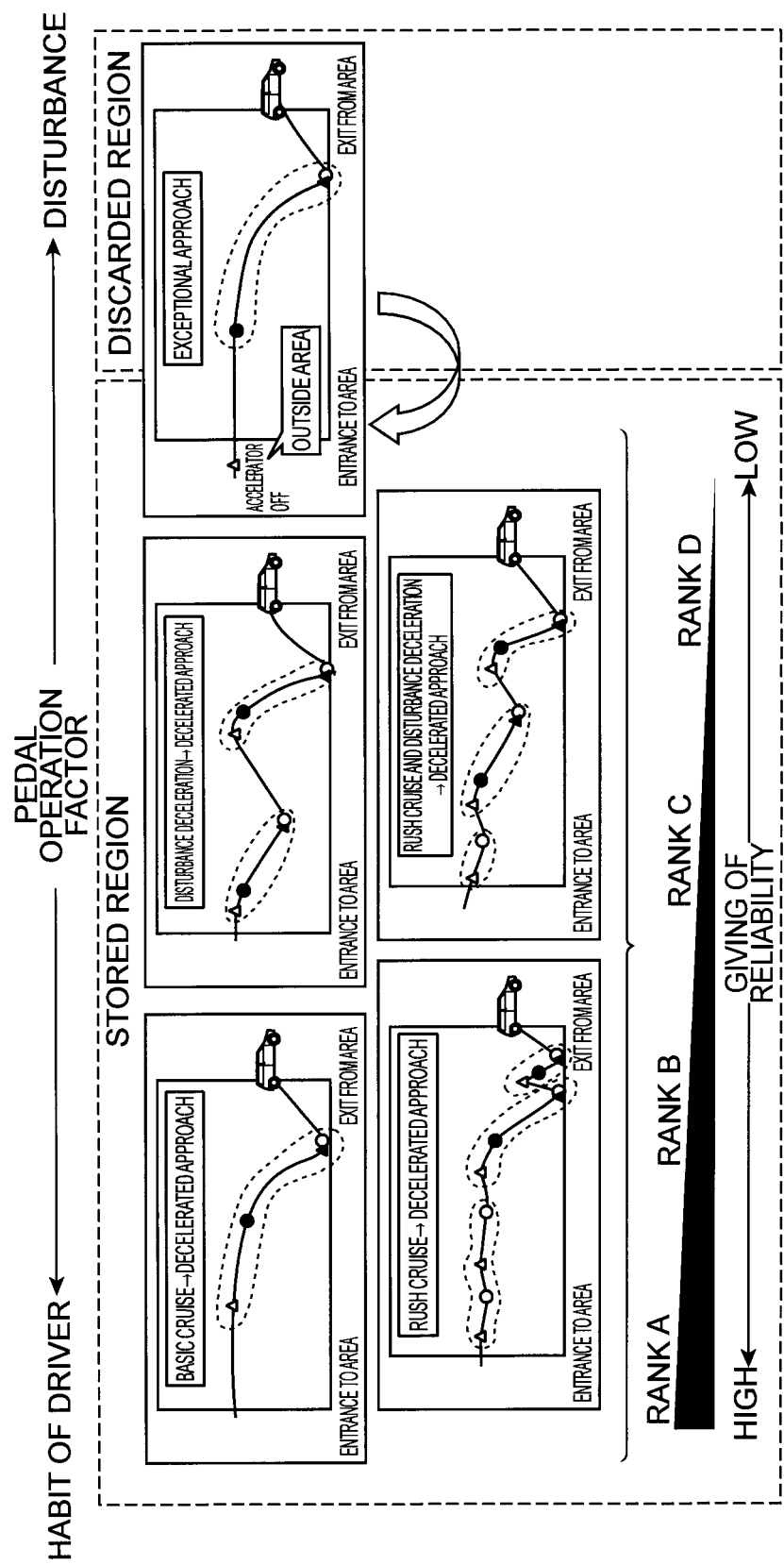
FIG. 4 is a diagram illustrating the traveling pattern of a support target according to this embodiment.
Figure 5:
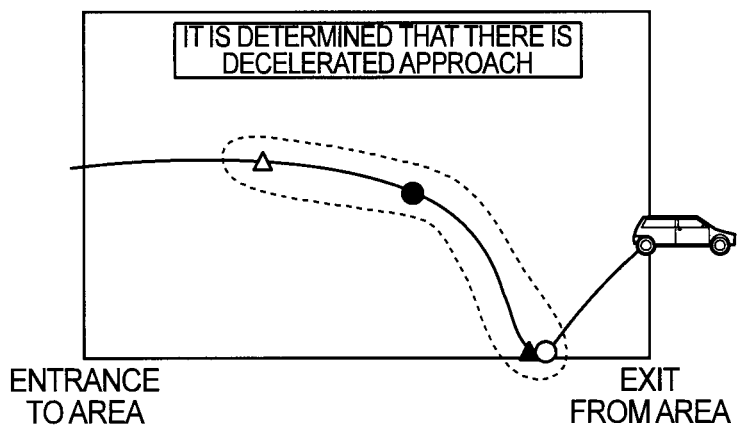
FIG. 5 is a diagram illustrating problems during learning. Specifically.
Figure 5:
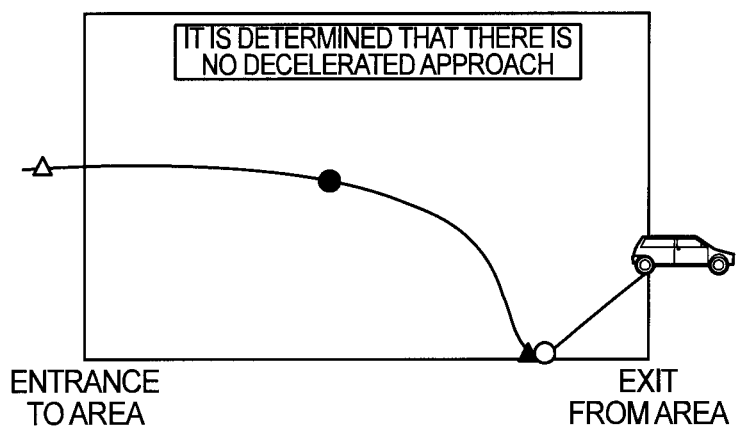
Figure 6:
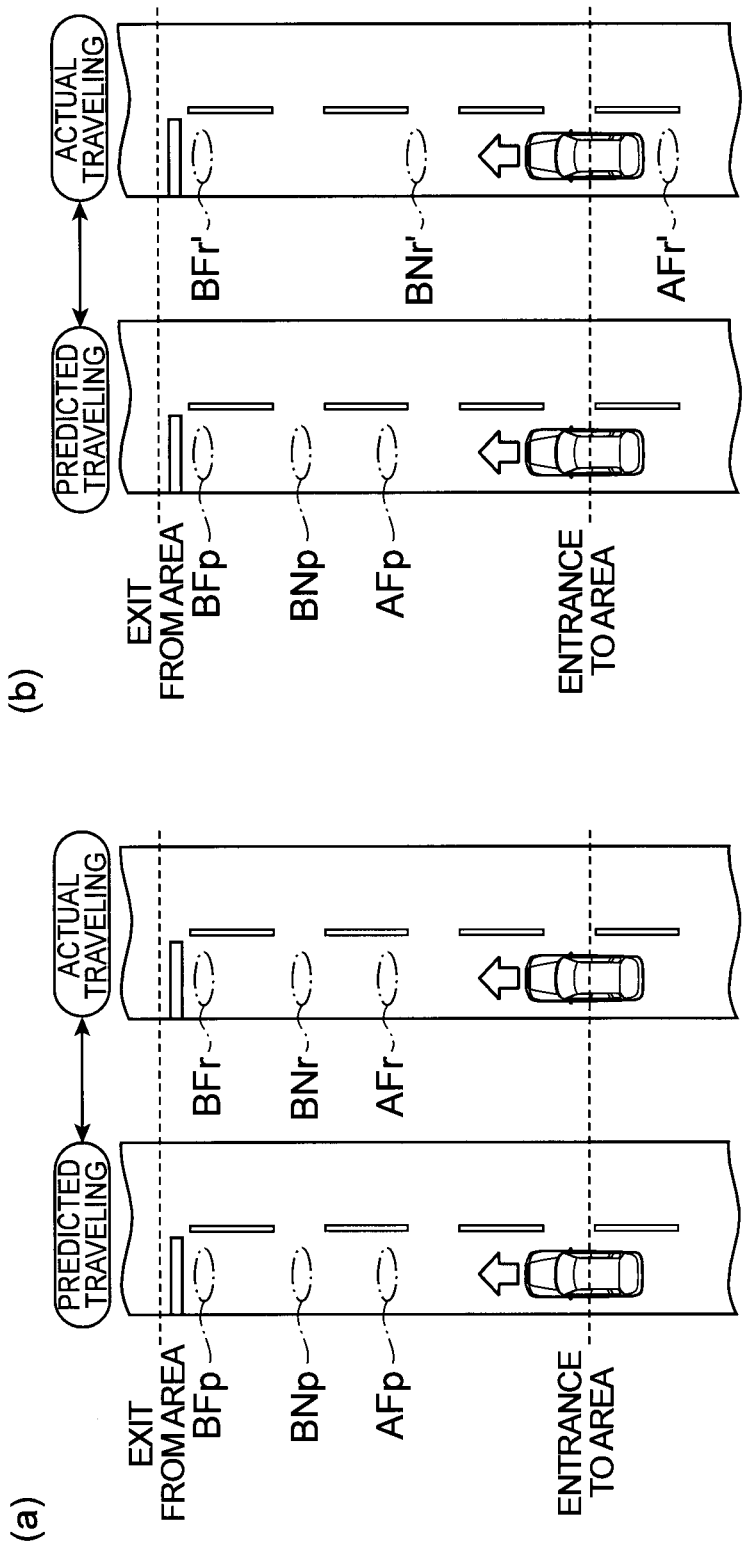
FIG. 6 is a diagram illustrating problems during prediction. Specifically.
Figure 7:
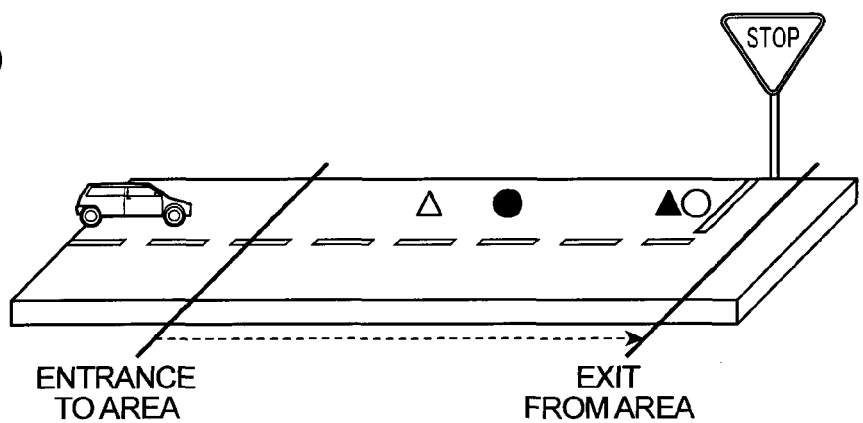
FIG. 7 is a diagram illustrating an example of the case in which some driving operations of the decelerated approach are performed outside the area. Specifically.
Figure 7:
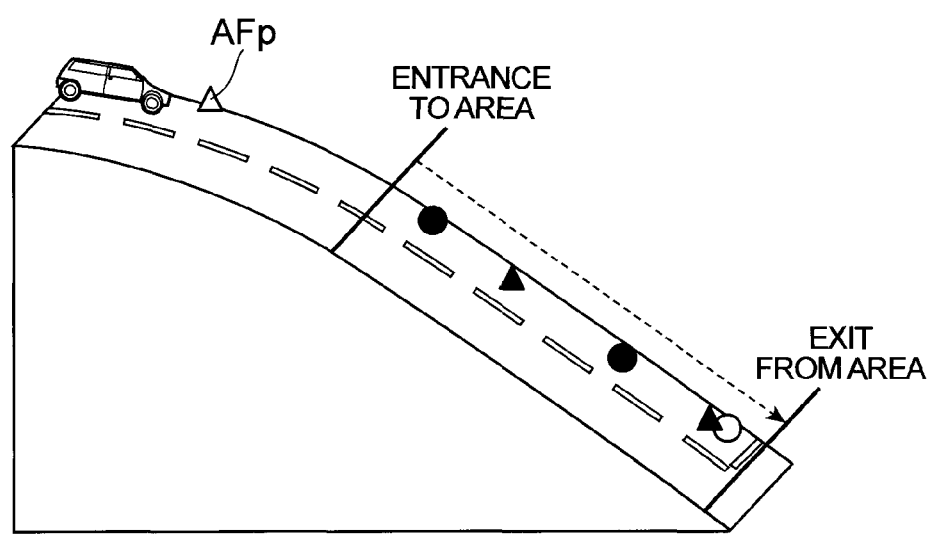
Figure 8:
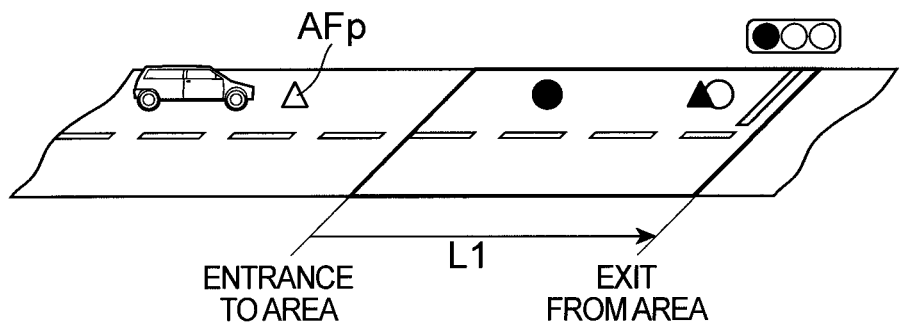
FIG. 8 is a diagram illustrating an example of the case in which some driving operations of the decelerated approach are performed outside the area on the flat road. Specifically.
Figure 8:
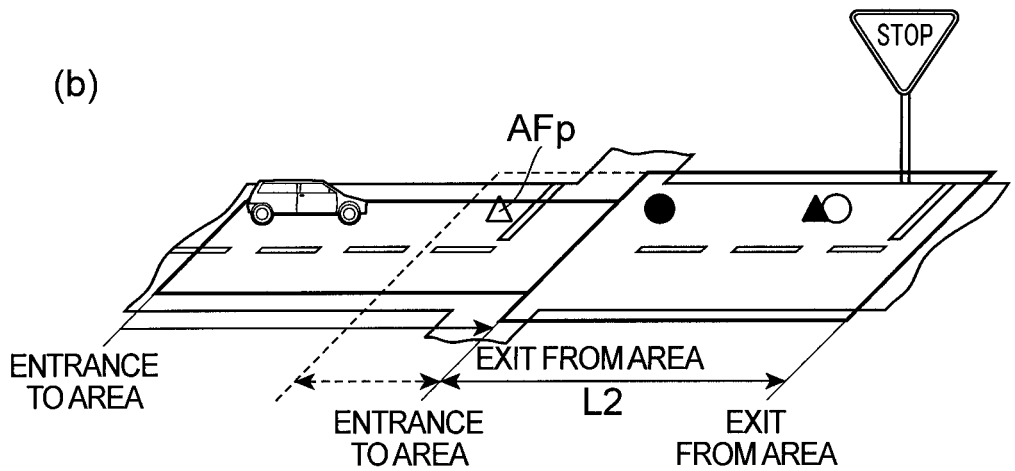

Next, before the deceleration action learning process is described in detail, a traveling pattern used in the deceleration action learning and problems in learning or prediction will be described with reference to FIGS. 3 to 8. FIG. 3 shows an example of the traveling pattern. FIG. 4 shows the traveling pattern of a support target. FIG. 5 is a diagram illustrating problems in learning. FIG. 6 is a diagram illustrating problems in prediction. FIG. 7 shows an example of the case in which some driving operations of the decelerated approach are performed outside the area. FIG. 8 shows an example of the case in which some driving operations of the decelerated approach are performed outside the area on a flat road.

In FIGS. 3 to 8, for an accelerator operation and a brake operation, a white triangle indicates an operation of stepping off the accelerator, a white circle indicates an operation of stepping on the accelerator, a black triangle indicates an operation of stepping off the brake, and a black circle indicates an operation of stepping on the brake. In addition, in the graph of the traveling patterns (driving operation patterns) indicated by each mark, the horizontal axis indicates a distance and the vertical axis indicates a vehicle speed. Basically, there are a block before approach, a block during approach, a block after approach.

In this embodiment, the traveling patterns before approach are set on the basis of an action before approach, considering the driving operation habit of the driver or the influence of disturbance (factor causing the pedal operation of the driver), and include a basic cruise, a rush cruise, disturbance deceleration, a rush cruise and disturbance deceleration. The basic cruise is a pattern in which no acceleration/deceleration action is performed before the decelerated approach to a deceleration target. The rush cruise is a pattern in which only the acceleration action (stepping-on/stepping-off the accelerator operation) is performed before the decelerated approach. The disturbance deceleration is a pattern in which only the deceleration action (stepping-on/stepping-off the brake operation) by disturbance (for example, the avoidance of a stopped vehicle and cutting-in) is performed before the decelerated approach. The rush cruise and disturbance deceleration is a pattern in which the acceleration action and the deceleration action are performed before the decelerated approach. The use of the various kinds of traveling patterns makes it possible to determine whether an action before decelerated approach is performed by the driving operation habit of the driver or the influence of disturbance. As a result, it is possible to provide deceleration prediction information with high accuracy.

In this embodiment, the traveling pattern during approach is a decelerated approach to the deceleration target. There are three approaches, that is, a basic approach, a pumping approach, and an exceptional approach and furthermore there is a pattern in which forward creep is added to each of three approaches. The basic approach (no forward creep) is a pattern in which stepping-off the accelerator and a set of stepping-on and stepping-off the brake are included as the deceleration action (there are a case in which stepping-on the accelerator is included and a case in which stepping-on the accelerator is not included) and there is no forward creep. The pumping approach (no forward creep) is a pattern in which stepping-off the accelerator and two or more sets of stepping-on and stepping-off the brake are included as the deceleration action (there are a case in which stepping-on the accelerator is included and a case in which stepping-on the accelerator is not included) and there is no forward creep. The exceptional approach (no forward creep) is a pattern in which the first accelerator OFF operation, which is the deceleration action, is not performed in the area, one or more sets of stepping-on and stepping-off the brake are included (there are a case in which stepping-on the accelerator is included and a case in which stepping-on the accelerator is not included), and there is no forward creep. For each traveling pattern, there is a pattern in which the forward creep is added to each of the patterns later. The forward creep is a pattern in which, after the vehicle is stopped, the driver repeatedly performs the operations of stepping on and off the brake to gradually change the stop position. In the case of the exceptional approach in which no accelerator OFF operation is performed in the area, the vehicle enters the area during the decelerated approach and thus there is no block before approach. In addition, in each of the decelerated approaches, when stepping-on the accelerator, which is a deceleration action, is not performed in the area, the vehicle exits from the area during the decelerated approach and thus there is no block after approach.

In this embodiment, the traveling pattern after approach is a pattern in which the vehicle starts after stop during the decelerated approach and includes a basic start, a slow start, a two-stage stop, and a two-stage stop and slow start. The basic start is a pattern in which acceleration and deceleration are not performed after the decelerated approach. The slow start is a pattern in which only the acceleration action (stepping-on/stepping-off the accelerator operation) is performed after the decelerated approach. The two-stage stop is a pattern in which only the deceleration action (stepping-on/stepping-off the brake operation) is performed after the decelerated approach. The two-stage stop and slow start is a pattern in which the acceleration action and the deceleration action are performed after the decelerated approach.

The traveling pattern in each area is a combination of the traveling pattern before approach, the traveling pattern during approach (decelerated approach), and the traveling pattern (component name) after approach. In particular, the following five traveling patterns are important: a traveling pattern including a decelerated approach from the basic cruise; a traveling pattern including a decelerated approach from the rush cruise; a traveling pattern including a decelerated approach from the disturbance deceleration; a traveling pattern including a decelerated approach from the rush cruise and disturbance deceleration; and a traveling pattern including the exceptional pattern. The five traveling patterns are prediction targets in deceleration prediction.

In this embodiment, when stepping-off the accelerator during the decelerated approach is included in the area, the vehicle enters the area before the decelerated approach and this approach is called "entrance before approach". When stepping-off the accelerator is not included in the area, the vehicle enters the area during the decelerated approach and this approach is called "entrance during approach". Among the five traveling patterns, four patterns, that is, the traveling pattern including the decelerated approach from the basic cruise, the traveling pattern including the decelerated approach from the rush cruise, the traveling pattern including the decelerated approach from the disturbance deceleration, and the traveling pattern including the decelerated approach from the rush cruise and disturbance deceleration correspond to the entrance before approach, and the traveling pattern including the exceptional pattern corresponds to the entrance during approach. When stepping-on the accelerator is not included in the area, the vehicle exits from the area during the decelerated approach, which is called "exit during approach".

FIG. 3 shows an example of the combination of the traveling patterns. Pattern 1 is a traveling pattern, which is a combination of a basic cruise before approach, a basic cruise during approach, and a basic start after approach. Pattern 2 is a traveling pattern, which is a combination of disturbance deceleration before approach, a pumping approach and forward creep during approach, and a slow start after approach. Pattern 3 is a traveling pattern, which is a combination of the disturbance deceleration before approach, a basic approach and forward creep during approach, and the slow start after approach. Pattern 4 is a traveling pattern, which is a combination of a rush cruise before approach, the basic approach and forward creep during approach, and a two-stage stop after approach. Pattern 5 is a traveling pattern, which is a combination of a rush cruise and disturbance deceleration before approach, the basic approach during approach, and a two-stage stop and slow start after approach. Pattern 6 is a traveling pattern, which is a combination of no block before approach (entrance during approach) because of stepping-off the accelerator during the decelerated approach outside the area, an exceptional approach during approach (no stepping-off the accelerator), and the basis start after approach. Pattern 7 is a traveling pattern, which is a combination of no block before approach (entrance during approach) because of stepping-off the accelerator outside the area during the decelerated approach, the exceptional approach during approach (no stepping-off the accelerator), and no block after approach (exit during approach) because of stepping-on the accelerator outside the area during decelerated approach.

In the deceleration action learning, as shown in FIG. 4, basically, the traveling patterns, in which all pedal operations of the decelerated approach are performed in the area, including the traveling patterns (the basic cruise, the rush cruise, the disturbance deceleration, and the rush cruise and disturbance deceleration) of the block before approach capable of distinguishing the traveling pattern before the decelerated approach in deceleration prediction are learning targets (regions stored in the database 5b). Basically, since data for the traveling pattern which does not include the decelerated approach is not used to generate the deceleration prediction information, it is not needed as learning data and is discarded. This is data of a "discarded region" shown in FIG. 4 and is a traveling pattern which does not include a deceleration and stop action to a deceleration target mainly by the influence of disturbance.

As such, in the case in which the deceleration action learning is performed under the condition that all the pedal operations of the decelerated approach are performed in the area, when all of stepping-off the accelerator, stepping-on/stepping-off the brake, and stepping-on the accelerator, which are deceleration actions, are performed in the area as shown in FIG. 5(a), it is determined that there is a decelerated approach and the actions become learning targets. When deceleration prediction is performed, as shown in FIG. 6(a), it is possible to provide deceleration prediction information (a deceleration start position AFp, a brake start position BNp, and a stop target position BFp) corresponding to the traveling pattern before approach after the vehicle enters the area, among the data items stored as the learning data. The deceleration prediction information is suitable for a deceleration start position AFr, a brake start position BNr, and a stop position BFr during actual traveling.

As shown in FIG. 5(b), in the deceleration action learning, when the decelerated approach to the deceleration target is performed, but the accelerator is stepped off outside the area, it is determined that there is no decelerated approach and the decelerated approach is excluded from the learning target and is not stored as the learning data. When the accelerator is stepped off outside the area during actual traveling, as shown in FIG. 6(b), the deceleration prediction information (the deceleration start position AFp, the brake start position BNp, and the stop target position BFp) is greatly different from a deceleration start position AFr', a brake start position BNr', and a stop position BFr' during the actual traveling. In this case, in the deceleration prediction, deceleration starts at the deceleration start position AFr' during the actual traveling. Therefore, the deceleration prediction cannot be performed.

However, during the actual traveling, in some cases, even though there is a decelerated approach to the deceleration target, all of the driving operations (stepping-off the accelerator, stepping-on/stepping-off the brake, and stepping-on the accelerator) of the deceleration action, which is the decelerated approach, are not performed in the area due to, for example, the driving operation habit of the driver, surrounding traffic conditions, and the shape of the road. In this case, (for example, when the first accelerator OFF operation in the driving operation group of the deceleration action is not performed in the area or when the final accelerator ON operation is not performed in the area), the actions are regarded as learning targets and are stored as the learning data. Therefore, it is possible to predict the actions and an eco-driving support opportunity increases.

For example, as shown in FIG. 7, in the areas with the same effective distance from the entrance side to the exit side, the position of each driving operation is different on a flat road and a downhill road. In the case of the flat road shown in FIG. 7(a), in general, the vehicle needs to start deceleration at a position which is a little close to the deceleration target in order to reach the deceleration target. Therefore, all of the driving operations of the decelerated approach are performed in the area. On the other hand, in the case of the downhill road shown in FIG. 7(b), even when the accelerator is stepped off in an early stage before the vehicle is stopped, the vehicle can reach the deceleration target. As such, when the accelerator is stepped off in the early stage, the engine brake is operated and fuel consumption can be reduced. Therefore, in the case of the downhill road, in some cases, it is preferable to step off the accelerator at a position away from the deceleration target. In this case, the accelerator OFF position AFp is not in the area.

As such, in the case of the downhill road, in some cases, the accelerator OFF position AFp is not in the area even though the decelerated approach is normally performed. In this case, the actions need to be included in the learning target. When the actions are included in the learning target, the number of learning targets increases and it is possible to predict the decelerated approach. Therefore, a driving support opportunity increases. As a result, in the case of the downhill road, it is possible to shorten the deceleration timing (accelerator OFF timing) without depending on the driving skill of the driver and thus improve fuel efficiency.

As shown in FIG. 8, in some cases, the effective distance of the area is reduced by the definition of the area and the accelerator OFF position AFp is not included in the area even on the flat road. In the example shown in FIG. 8(a), in some cases, the set value of the distance to the deceleration target in the specifications of the remaining distance variable of the navigation is less than an area effective distance L1. In this case, when the accelerator is stepped off at the normal timing, the accelerator OFF position AFp is outside the area. As shown in FIG. 8(b), when the distance to an adjacent deceleration target is short and the remaining distance variable to the deceleration target overlaps, an area effective distance L2 is short in a non-preferential area. In this case, when the accelerator is stepped off at the normal timing, the accelerator OFF position AFp is also outside the area. In this case, the deceleration action needs to be a learning target.

In some cases, the accelerator OFF position is not included in the area even on the flat road, depending on road conditions. For example, in a case in which the distance to travel is long on the road (for example, a straight national road and a bypass) with a good view to a stop position, when a traffic signal in front turns red, the driver tends to step off the accelerator early. In this case, the accelerator OFF position is outside the area. This action also needs to be a learning target.

In the deceleration action learning of the ITSECU 5, as described above, both the case in which some of the driving operations of the decelerated approach are performed outside the area and the case in which all of the driving operations of the decelerated approach are performed in the area are learning targets. As a result, as shown in FIG. 4, data included in the discarded region can be stored as the learning data and the learning data can be used to perform deceleration prediction. As a result, an eco-driving support opportunity can increase.

Figure 9:
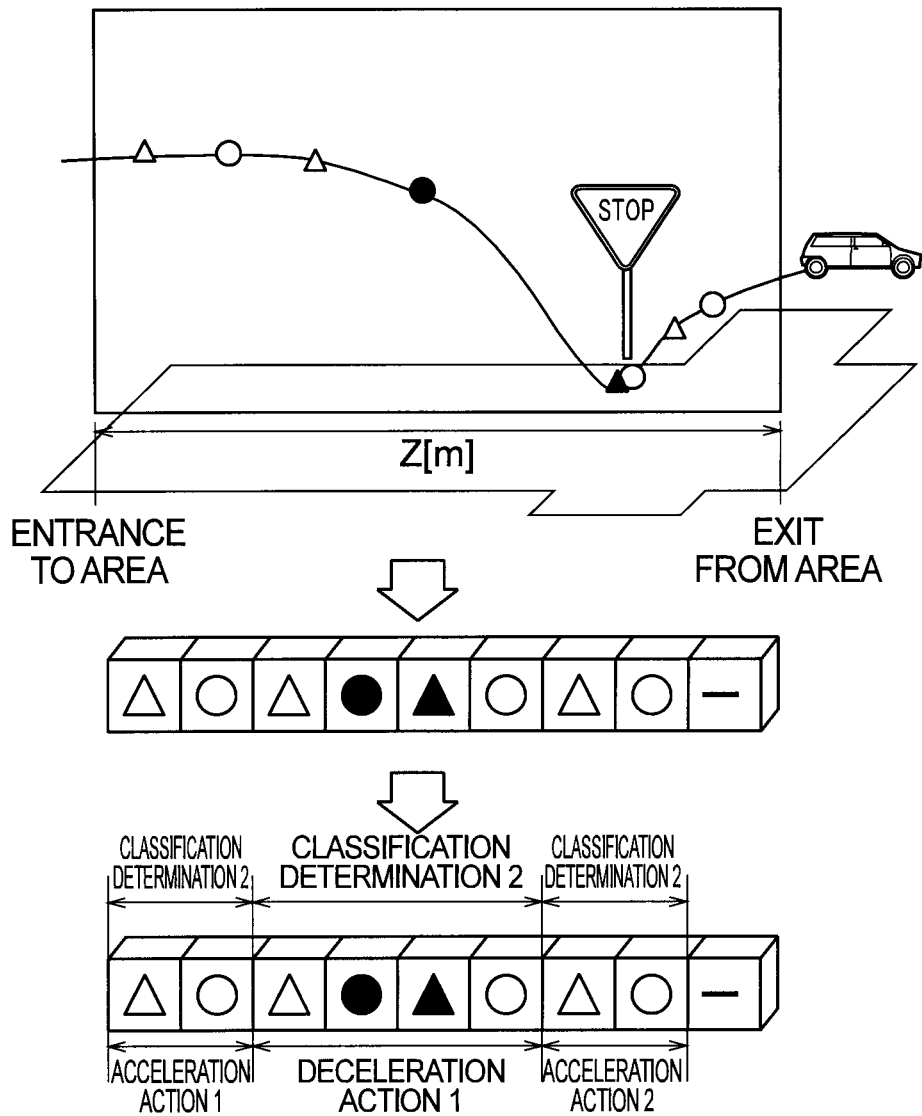
FIG. 9 is a diagram illustrating an acceleration/deceleration action classifying process according to this embodiment.
Figure 10:
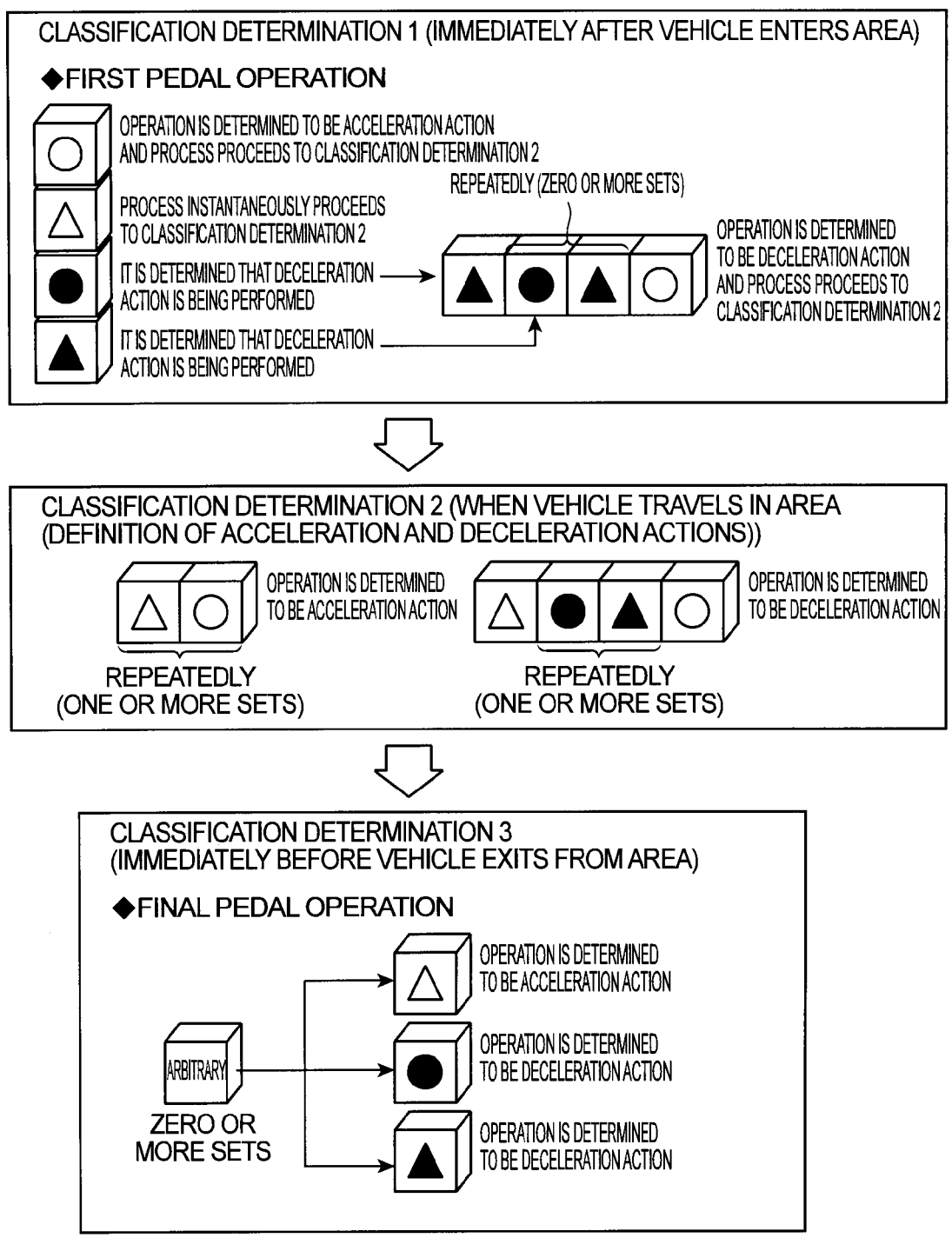
FIG. 10 is a diagram illustrating a determining method used in the acceleration/deceleration action classifying process according to this embodiment.
Figure 11:
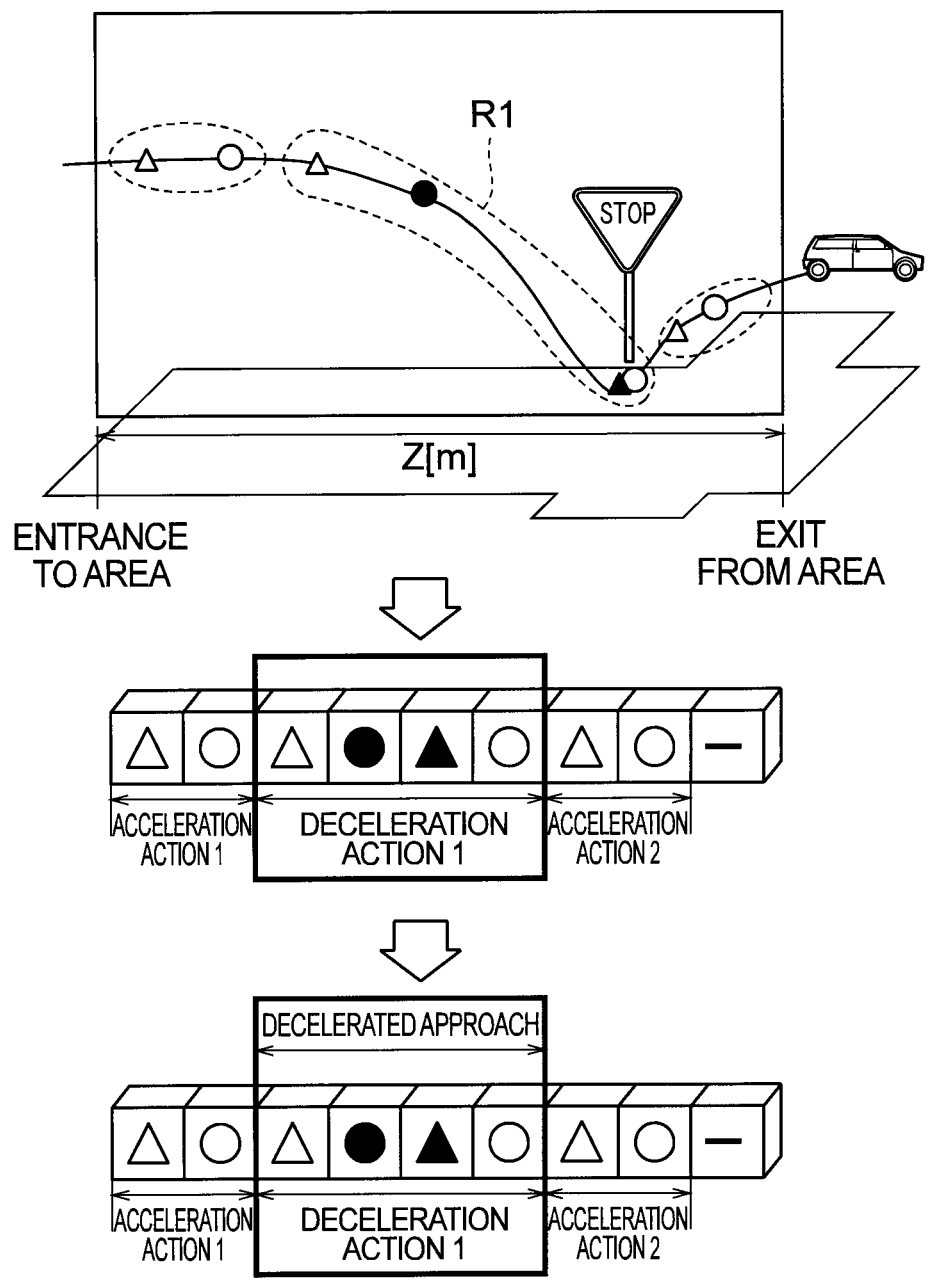
FIG. 11 is a diagram illustrating a decelerated approach determining process according to this embodiment.
Figure 12:
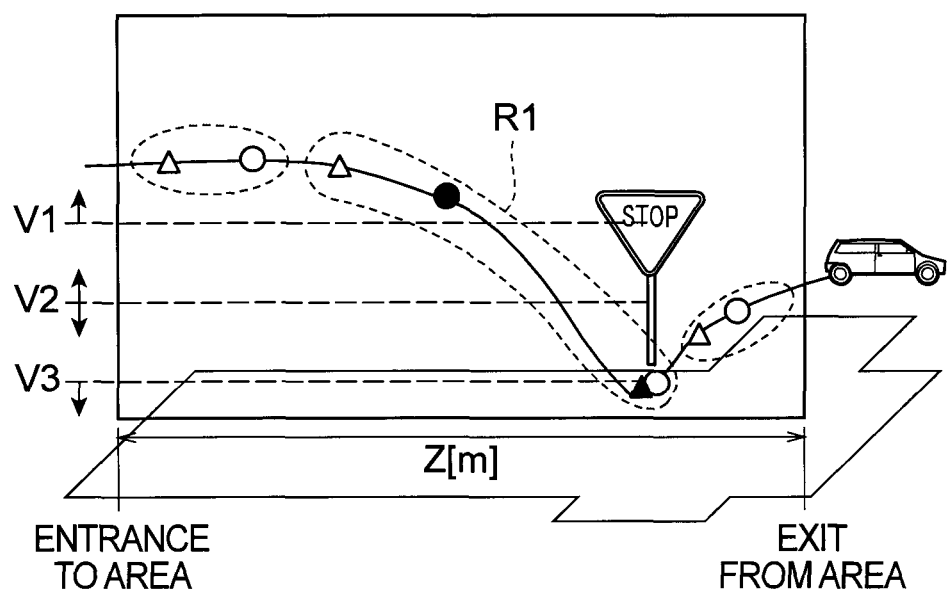
FIG. 12 is a diagram illustrating a determining method used in the decelerated approach determining process according to this embodiment.
Figure 13:
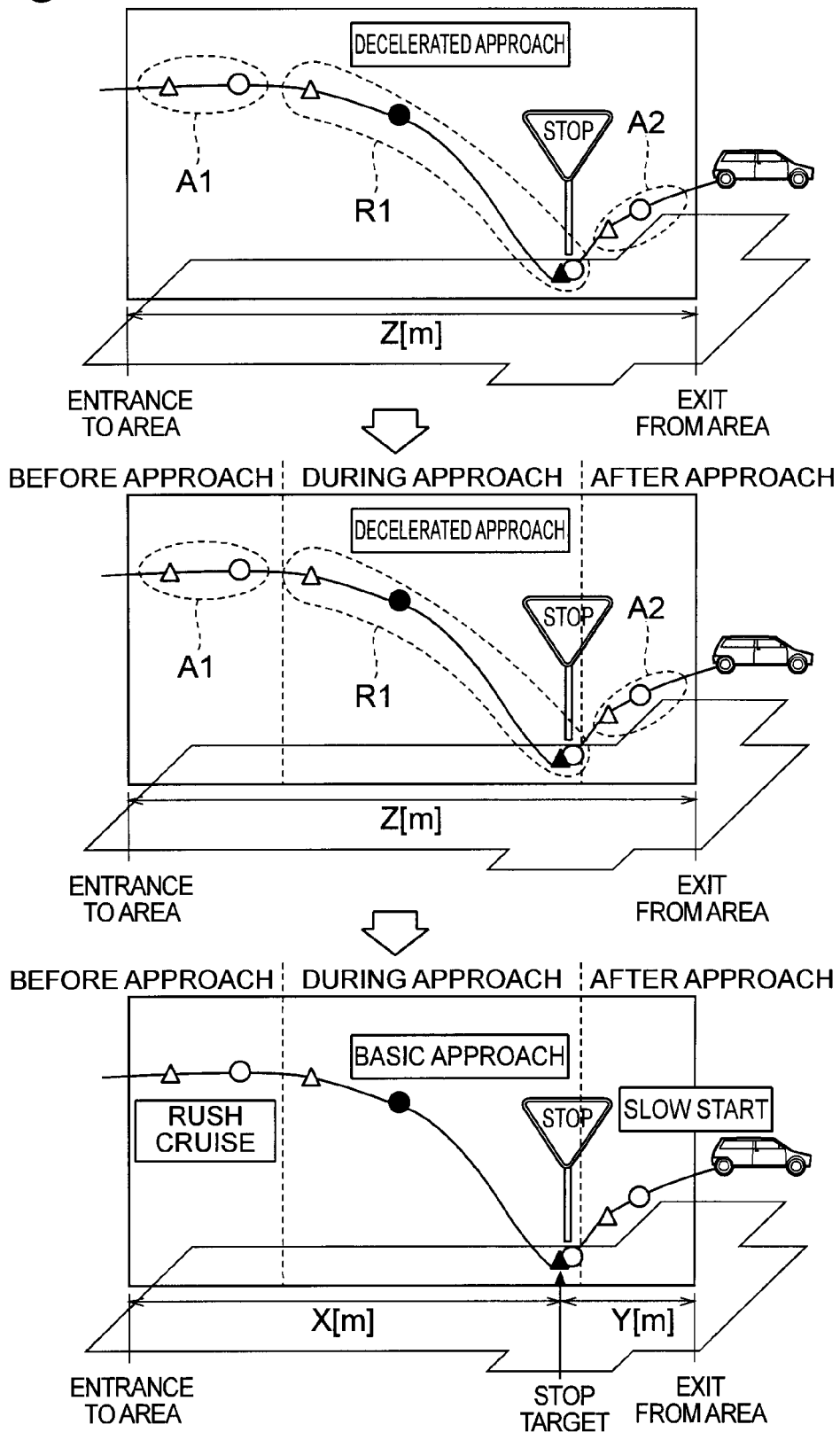
FIG. 13 is a diagram illustrating a traveling pattern determining process according to this embodiment.

Next, the deceleration action learning process of the ITSECU 5 will be described with reference to FIGS. 9 to 13. FIG. 9 is a diagram illustrating an acceleration/deceleration action classifying process. FIG. 10 is a diagram illustrating a determining method used in the acceleration/deceleration action classifying process. FIG. 11 is a diagram illustrating a decelerated approach determining process. FIG. 12 is a diagram illustrating a determining method used in the decelerated approach determining process. FIG. 13 is a diagram illustrating a traveling pattern determining process.

When the candidate area (which is referred to as a support area in some cases) is set by the candidate area learning, the ITSECU 5 determines whether the vehicle enters the candidate area whenever the current position information is received from the navigation system 3 during the traveling of the vehicle. When it is determined that the vehicle has entered the candidate area, the ITSECU 5 stores the accelerator operation information, the brake operation information, and the vehicle state information (for example, brake pressure information, vehicle speed information, and acceleration/deceleration information) from the CAN 4 and the vehicle position information from the navigation system 3 in the database 5b so as to be associated with each other at a predetermined time interval or at intervals of a predetermined traveling distance. Then, the ITSECU 5 determines whether the vehicle exits from the candidate area whenever the current position information is received from the navigation system 3 during the traveling of the vehicle. When it is determined that the vehicle has exited from the candidate area, the ITSECU 5 ends the storage of the information in the database 5b and counts the number of times the vehicle passes through the candidate area. Only information when stepping-on/stepping-off the accelerator pedal and the brake pedal are detected may be stored as data in the database 5b.

When the vehicle exits from the candidate area, the ITSECU 5 performs a learning process on the candidate area on the basis of the currently stored data. In the learning process, the ITSECU 5 determines whether there is a decelerated approach on the basis of the position of the vehicle when the accelerator pedal and the brake pedal are operated during the traveling of the vehicle in the candidate area, divides the candidate area in which there is a decelerated approach into blocks, and learns the traveling patterns, which are combinations of the components (the above-mentioned traveling patterns of each block) of each block and the decelerated approach information of each traveling pattern. In order to perform the above-mentioned operation, the ITSECU 5 performs an acceleration/deceleration action classifying process, a decelerated approach determining process, a traveling pattern determining process, and a learning result registration process.

Next, the acceleration/deceleration action classifying process will be described. As described above, the deceleration action to be classified is performed in the order of stepping-off the accelerator, stepping-on/stepping-off (repeatedly) the brake, and stepping-on the accelerator. The acceleration action to be classified is performed (repeatedly) in the order of stepping-off the accelerator and stepping-on the accelerator.

First, the ITSECU 5 stores, in a list, vehicle position information, vehicle speed information, and the information of each operation when the accelerator is stepped on/off and the brake is stepped on/off in the current traveling of the vehicle in the candidate area so as to be associated with each other, with reference to the database 5b. In the example shown in FIG. 9, the position and speed of the vehicle and the operations performed in the order of stepping-off the accelerator, stepping-on the accelerator, stepping-off the accelerator, stepping-on the brake, stepping-off the brake, stepping-on the accelerator, stepping-off the accelerator, and stepping-on the accelerator in the candidate area is stored in the list. When there is no pedal operation in the area, a deceleration stop action is not performed and the deceleration action learning process is forcibly ended.

Then, the ITSECU 5 performs classification determination 1 shown in FIG. 10 on the basis of the pedal operation (the first pedal operation after the vehicle enters the area) stored at the head of the list, determines an acceleration action or a deceleration action, and sets the number of acceleration actions and the number of deceleration actions in the list. For the number of acceleration actions, a smaller number is set to the acceleration action which is performed at a position closer to the entrance side of the area, among the acceleration actions (pedal operation group) determined in the list. For the number of deceleration actions, a smaller number is set to the deceleration action which is performed at a position closer to the entrance side of the area, among the deceleration actions (pedal operation group) determined in the list.

Next, classification determination 1 will be described. When the first pedal operation after the vehicle enters the area is an accelerator ON operation, the pedal operation is determined to be an acceleration action, acceleration action 1 is set as the number of acceleration actions, and the determining process proceeds to classification determination 2. In the case of an accelerator OFF operation, the determining process proceeds to classification determination 2 without performing any operation. When the brake is stepped on or off, first, it is determined that a deceleration action is being performed. Then, it is determined whether an operation performed in the order of (zero or more sets of) stepping-on/off the brake and stepping-on the accelerator is included in the deceleration action on the basis of the next stored information about the pedal operation in the list. When the operation is included, the pedal operation is determined to be the deceleration action, deceleration action 1 is set as the number of deceleration actions, and the determining process proceeds to classification determination 2. In the determining process, even when the accelerator OFF operation is not performed at the beginning or even when the accelerator OFF operation and the brake ON operation are not performed at the beginning, the pedal operation can be extracted as the deceleration action. When the operation up to stepping-on the accelerator is not included, the pedal operation is not determined to be the deceleration action (the deceleration action is maintained). When it is determined that the deceleration action is being performed and there is no pedal operation in the list, the determining process proceeds to classification determination 3.

Then, the ITSECU 5 performs classification determination 2 shown in FIG. 10 on the basis of all of the pedal operations (all of the pedal operations in the area) stored in the list, determines an acceleration action or a deceleration action, and sets the number of acceleration actions and the number of deceleration actions in the list.

Next, classification determination 2 will be described. It is determined whether (one or more sets of) stepping-off and stepping-on the accelerator are included on the basis of all of the pedal operations in the area. When stepping-off and stepping-on the accelerator are included, the pedal operation is determined to be the acceleration action and the number of acceleration actions is set. In addition, it is determined whether stepping-off the accelerator and (one or more sets of) stepping-on and stepping-off the brake, and stepping-on the accelerator are included on the basis of all of the pedal operations in the area. When the operation is included, the peal operation is determined to be the deceleration action and the number of deceleration actions is set. When it is determined that the acceleration action or the deceleration action is being performed and there is no pedal operation in the list, the determining process proceeds to classification determination 3. In the other cases, the acceleration/deceleration classifying process ends.

Then, the ITSECU 5 performs classification determination 3 shown in FIG. 10 on the basis of the final pedal operation (the final pedal operation immediately before the vehicle exits from the area) stored in the list, determines an acceleration action and a deceleration action, and sets the number of acceleration actions and the number of deceleration actions in the list.

Next, classification determination 3 will be described. When the final pedal operation immediately after the vehicle exits from the area is the accelerator OFF operation, the pedal operation is determined to be the acceleration action and the number of acceleration actions is set. When the final pedal operation is the brake ON operation, the pedal operation is determined to be the deceleration action and the number of deceleration actions is set. When the final pedal operation is the brake OFF operation, the pedal operation is determined to be the deceleration action and the number of deceleration actions is set. Even when stepping-on the accelerator is not finally performed or even when stepping-on the accelerator and stepping-off the brake are not finally performed, the pedal operation can be extracted as the deceleration action.

In the example shown in FIG. 9, as described above, stepping-off the accelerator, stepping-on the accelerator, stepping-off the accelerator, stepping-on the brake, stepping-off the brake, stepping-on the accelerator, stepping-off the accelerator, and stepping-on the accelerator are stored in the list. First, the determining process instantaneously proceeds from classification determination 1 to classification determination 2 on the basis of stepping-off the accelerator stored at the head of the list. Then, in classification determination 2, the pedal operation is determined to be the acceleration action on the basis of stepping-off the accelerator and stepping-on the accelerator from the head of the list, and acceleration action 1 is set as the number of acceleration actions. Then, the pedal operation is determined to be the deceleration action on the basis of stepping-off the accelerator, stepping-on the brake, and stepping-off the brake, and stepping-on the accelerator performed subsequent to the above-mentioned operations, and deceleration action 1 is set as the number of deceleration actions. Then, the pedal operation is determined to be the acceleration action on the basis of stepping-off the accelerator and stepping-on the accelerator performed subsequent to the above-mentioned operations, and acceleration action 2 is set as the number of acceleration actions.

When the deceleration action cannot be extracted from the pedal operation group which is stored in the list by the acceleration/deceleration action classifying process, there is no decelerated approach and the ITSECU 5 forcibly ends the deceleration action learning process.

Next, the decelerated approach determining process will be described. First, the ITSECU 5 extracts the pedal operation group which is determined to be the deceleration action from the list. In the example shown in FIG. 11, the pedal operation group including stepping-off the accelerator, stepping-on the brake, stepping-off the brake, and stepping-on the accelerator corresponding to deceleration action 1 is extracted. In this example, there is one deceleration action. However, there may be a plurality of deceleration actions.

Then, the ITSECU 5 determines whether each of the extracted deceleration actions is a decelerated approach to the deceleration target on the basis of the vehicle speed corresponding to each pedal operation. Basically, the determination process is focused on the vehicle speed (vehicle speed when deceleration starts) when the accelerator is stepped off and the vehicle speed (vehicle speed when deceleration ends) when the brake is stepped off in the deceleration action. As can be seen from the example shown in FIG. 3, the deceleration action of the decelerated approach is deceleration from a high speed to a low speed (in particular, stop), the deceleration action before approach is deceleration from a high speed to a high speed, and the deceleration action after approach is deceleration from a low speed to a low speed. Therefore, the deceleration action from a high speed to a low speed (stop) is determined to be the decelerated approach to the deceleration target. In addition, when stepping-off the accelerator is not included in the deceleration action, the determining process is focused on the vehicle speed (vehicle speed when the brake starts) when the brake is stepped on and the vehicle speed (vehicle speed when deceleration ends) when the brake is stepped off in the deceleration action. In this case, similarly to the above, the deceleration action in the decelerated approach is deceleration from a high speed to a low speed.

As shown in FIG. 12, a lower-limit vehicle speed V1 for determining a deceleration start vehicle speed during stepping-off the accelerator, an upper-limit vehicle speed V2 (<V1) for determining a deceleration end vehicle speed during stepping-off the brake, and a lower-limit vehicle speed V2 for determining a brake start vehicle speed during stepping-on the brake are set in advance by, for example, a real vehicle experiment. In this embodiment, the upper-limit vehicle speed during stepping-off the brake and the lower-limit vehicle speed during stepping-on the brake are the same vehicle speed V2. However, the upper-limit vehicle speed during stepping-off the brake and the lower-limit vehicle speed during stepping-on the brake may be different from each other.

When stepping-off the accelerator is included in the deceleration action (decelerated approach determination 1), it is determined whether the vehicle speed during stepping-off the accelerator included in the deceleration action is equal to or greater than the lower-limit vehicle speed V1 of stepping-off of the accelerator and the vehicle speed during stepping-off the brake included in the deceleration action is equal to or less than the upper-limit vehicle speed V2 of stepping-off the brake. When the conditions are satisfied, the deceleration action is determined to be the decelerated approach. When stepping-off the accelerator is not included in the deceleration action (decelerated approach determination 2), it is determined whether the vehicle speed during stepping-on the brake included in the deceleration action is equal to or greater than the lower-limit vehicle speed V2 of stepping-on the brake and the vehicle speed during the tuning-off of the brake included in the deceleration action is equal to or less than the upper-limit vehicle speed V2 of stepping-off the brake. When the conditions are satisfied, the deceleration action is determined to be the decelerated approach. Even when the accelerator is not stepped off at the beginning or the accelerator is not finally stepped on, the deceleration action can be extracted as the decelerated approach.

When the deceleration action is determined to be the decelerated approach, the ITSECU 5 determines whether there is a forward creep. The determining process is focused on the vehicle speed during stepping-off the brake included in the deceleration action which is determined to be the decelerated approach. When the brake OFF operation is continuously performed plural times at a low speed, it is determined that there is a forward creep.

As shown in FIG. 12, an upper-limit vehicle speed V3 (<V2) for determining a creep start during stepping-off the brake is set in advance by, for example, a real vehicle experiment. It is determined whether the vehicle speed during stepping-off the brake included in the deceleration action (decelerated approach) is equal to or less than the upper-limit vehicle speed V3. When the brake operation is continuously performed at the upper-limit vehicle speed V3 or less after the brake is stepped off, it is determined that there is a forward creep. In the other cases, it is determined that there is no forward creep. When there is a forward creep, the vehicle is stopped. Since the stop position of the vehicle varies depending on the operation of the driver stepping on/off the brake after the brake is stepped off, it is determined whether there is a forward creep in order to accurately determine the stop position of the vehicle.

When it is determined that there are a plurality of decelerated approaches, the ITSECU 5 determines the deceleration action closest to the exit area to be the decelerated approach. When there is a decelerated approach in the area, the ITSECU 5 increases the number of stops by one. Then, the ITSECU 5 divides the number of stops in the candidate area by the number of passages (the total number of passages) to calculate a stop rate. When there is no decelerated approach in the area, the ITSECU 5 forcibly ends the deceleration action learning process. In the example shown in FIG. 11 (FIG. 12), a deceleration action R1 satisfies the conditions of decelerated approach determination 1 and is determined to be the decelerated approach (no forward creep).

Next, the traveling pattern determining process will be described. First, the ITSECU 5 allocates the deceleration action, which is the decelerated approach, to the block during approach. Then, the ITSECU 5 allocates the acceleration action and/or the deceleration action before decelerated approach to the block before approach. At that time, when stepping-off the accelerator is not included in the deceleration action, which is the decelerated approach, it is determined that there is no block before approach. Then, the ITSECU 5 allocates the acceleration action and/or the deceleration action after decelerated approach to the block after approach. At that time, when stepping-on the accelerator is not included in deceleration action, which is the decelerated approach, it is determined that there is no block after approach. The case in which there is no block before approach is entrance during approach and the other cases are entrance before approach.

When the area is divided into the blocks, the ITSECU 5 determines one traveling pattern (component name) from the basic cruise, the rush cruise, the disturbance deceleration, and the rush cruise and disturbance deceleration on the basis of the acceleration action and/or the deceleration action included in the block before approach. In addition, the ITSECU 5 determines one decelerated approach (component name) from the basic approach (no forward creep), the basic approach (forward creep), the pumping approach (no forward creep), the pumping approach (forward creep), the exceptional approach (no forward creep), and the exceptional approach (forward creep) on the basis of the deceleration action, which is the decelerated approach, in the block during approach. When there is no block before approach, the exceptional approach is determined. The ITSECU 5 determines one traveling pattern (component name) from the basic start, the slow start, the two-stage stop, and the two-stage stop and slow start on the basis of the acceleration action and/or the deceleration action included in the block after approach. Then, the ITSECU 5 represents the traveling patterns in the entire area using combinations of the component names before the block, in the middle of the block, and after the block.

In the example shown in FIG. 13, the deceleration action R1, which is the decelerated approach, is allocated to the block during approach, an acceleration action A1 before the deceleration action R1 is allocated to the block before approach, and an acceleration action A2 after the deceleration action R1 is allocated to the block after approach. Then, the acceleration action A1 allocated to the block before approach is determined to be the rush cruise, the deceleration action R1 allocated to the block during approach is determined to be the basic approach, and the deceleration action R2 allocated to the block after approach is determined to be the slow start. In this way, the traveling patterns are determined by combinations of the rush cruise, the basic approach, and the slow start.

Then, the ITSECU 5 creates decelerated approach information for the determined traveling pattern. The decelerated approach information is created on the basis of the information of the deceleration action, which is the decelerated approach, and includes a deceleration start position specified from the position information when the first accelerator OFF operation is performed and vehicle speed information at that time, a brake start position specified from the position information when the first brake ON operation is performed and vehicle speed information at that time, and a stop target position specified from the position information when the final brake OFF operation is performed and vehicle speed information at that time. For the brake ON operation, when stepping-on/stepping-off the brake are repeated, the brake ON operation immediately after the accelerator OFF operation is extracted. For the brake OFF operation, when stepping-on/stepping-off the brake are repeated, the final brake OFF operation is extracted. However, when there is a forward creep, the first brake OFF operation by which the forward creep starts is extracted.

Next, the learning result registration process will be described. The ITSECU 5 registers the learning result obtained from the traveling of the vehicle in a given candidate area in the database 5b. Examples of the learning result include the number of passages, the number of stops (stop rate), and the decelerated approach information (deceleration prediction information) or reliability of each traveling pattern, which is a combination of the component names, in each candidate area (in some cases, a support area). Information, such as the number of passages or the number of stops, may be registered as the information of each traveling pattern. In particular, the information of each traveling pattern is classified into four traveling patterns for entrance before approach, that is, a traveling pattern including the decelerated approach from the basic cruise, a traveling pattern including the decelerated approach from the rush cruise, a traveling pattern including the decelerated approach from disturbance deceleration, and a traveling pattern including the decelerated approach from the rush cruise and disturbance deceleration, and one traveling pattern for the entrance during approach, which is a traveling pattern including the exceptional pattern and the classified traveling patterns are registered.

The deceleration start position included in the decelerated approach information is the usual deceleration start position when the vehicle (driver) is stopped at a deceleration target, the brake start position is the usual brake start position where the driver of the vehicle starts a brake operation, and the stop target position is the usual stop position of the vehicle (driver). Whenever the vehicle travels along the same traveling route, the deceleration start position information, brake start position information, and stop target position information of the same area are obtained and the distribution of the positions is obtained. For example, an average position in the distribution of the positions is registered as each position information item.

For the decelerated approach information (deceleration prediction information) or the reliability, learning data for all combinations of the traveling patterns may be registered. However, in the deceleration learning, one traveling pattern is predicted from the four traveling patterns for the entrance before approach (the traveling pattern including the decelerated approach from the basic cruise, the traveling pattern including the decelerated approach from the rush cruise, the traveling pattern including the decelerated approach from the disturbance deceleration, and the traveling pattern including the decelerated approach from the rush cruise and disturbance deceleration) and the exceptional pattern and the deceleration prediction information of the predicted traveling pattern is output. Therefore, only learning data for the five traveling patterns may be registered.

When the number of times the vehicle passes through the candidate area is equal to or greater than a predetermined value (for example, 5 times or more or 10 times or more) and the stop rate (corresponding to the frequency of stops) is equal to or greater than a threshold value (for example, 80% or more, or 90% or more), the ITSECU 5 specifies the candidate area as a support area and registers the candidate area as the support area.

Figure 14:
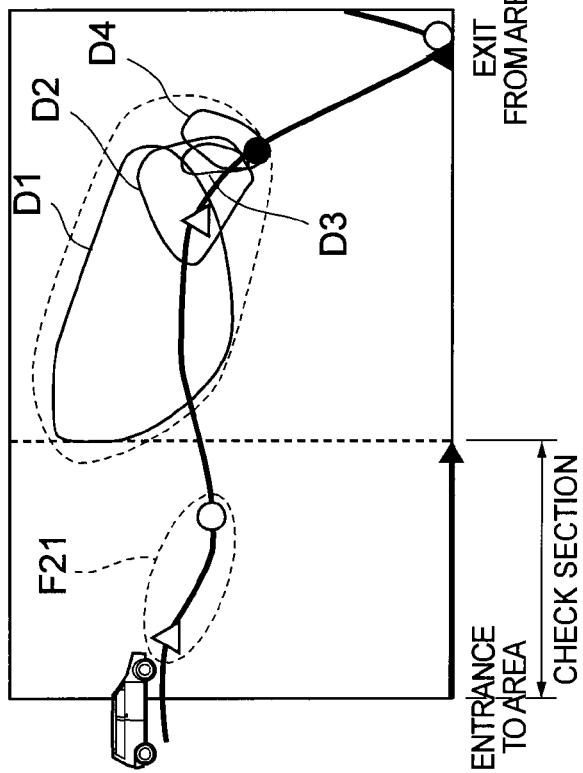
FIG. 14 is a diagram illustrating an example of the deceleration start position distribution of each traveling pattern and the distribution of actions before approach of a rush cruise pattern according to this embodiment. Specifically.
Figure 14:
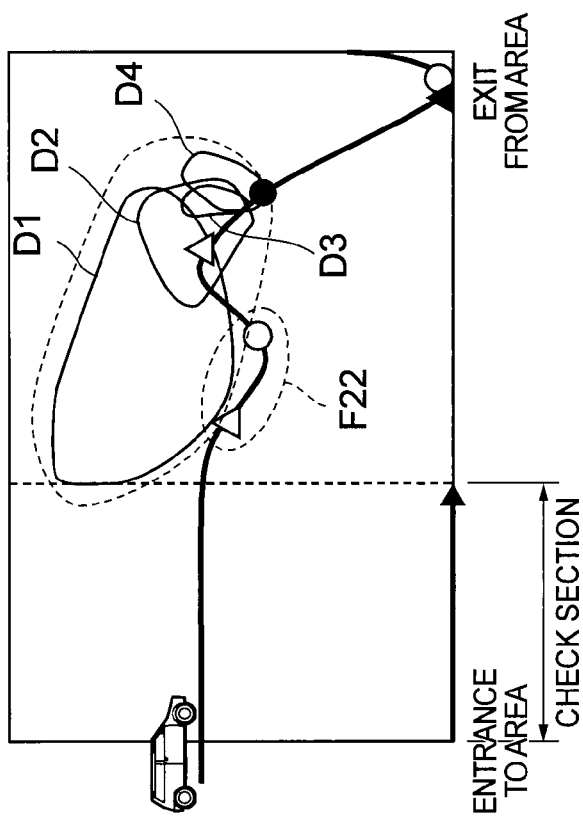

Next, the reliability will be described with reference to FIG. 14. FIG. 14 is a diagram illustrating an example of the distribution of the deceleration start positions in each traveling pattern and the distribution of the actions before approach in the rush cruise pattern.

The reliability is an index for determining the traveling pattern which is a base when the deceleration prediction information output during the entrance of the vehicle to the support area is predicted. In this embodiment, reliability ranks A to D are given to the traveling patterns (the traveling pattern including the decelerated approach from the basic cruise, the traveling pattern including the decelerated approach from the rush cruise, the traveling pattern including the decelerated approach from the disturbance deceleration, and the traveling pattern including the decelerated approach from the rush cruise and disturbance deceleration) when there is a block before approach and the reliability of an exceptional rank is given to the traveling pattern (exceptional pattern) when there is no block before approach. In order to set the reliability, some traveling results for the same area are needed. Therefore, when the number of passages or the number of stops is equal to or greater than a given value, the reliability is set.

When the reliability is set, the exceptional rank is set to the exceptional pattern and the ranks are set to the four traveling patterns other than the exceptional pattern in two steps. In the first step, the deceleration start positions of the decelerated approaches in each traveling pattern are compared and the ranks are given to the four traveling patterns such that a higher rank is given to the traveling pattern in which the decelerated approach is performed earlier from entrance to the area. FIG. 14 shows an example of the distribution of the deceleration start positions in each traveling pattern in a given area. In FIG. 14, reference numeral D1 indicates the distribution of the deceleration start position in the decelerated approach from the basic cruise, reference numeral D2 indicates the distribution of the deceleration start position in the decelerated approach from the rush cruise, reference numeral D3 indicates the distribution of the deceleration start position in the decelerated approach from the disturbance deceleration, and reference numeral D4 indicates the distribution of the deceleration start position in the decelerated approach from the rush cruise and disturbance deceleration. In the area, the rank A is set to the traveling pattern including the decelerated approach from the basic cruise, the rank B is set to the traveling pattern including the decelerated approach from the rush cruise, the rank C is set to the traveling pattern including the decelerated approach from the disturbance deceleration, and the rank D is set to the traveling pattern including the decelerated approach from the rush cruise and disturbance deceleration. The verification results in various areas prove that the deceleration action has the earliest start time in the decelerated approach from the basic cruise.

As such, when the reliability is set on the basis of only the deceleration start position, the following problems occur. The problems will be described with reference to FIG. 14. In this example, as described above, the rank A is given to the traveling pattern including the decelerated approach from the basic cruise and the rank B is given to the traveling pattern including the decelerated approach from the rush cruise. Therefore, when the vehicle enters the area, the deceleration prediction information of the traveling pattern including the decelerated approach from the basic cruise is output. As shown in FIG. 14(a), when an action F21 before approach in the rush cruise can be detected from a check section for an action before approach, it is possible to output the deceleration prediction information of the traveling pattern including the decelerated approach from the rush cruise. However, as shown in FIG. 14(b), an action F22 before approach in the rush cruise is delayed and cannot be detected from the check section for the action before approach, the deceleration prediction information of the traveling pattern including the decelerated approach from the rush cruise cannot be output even in the traveling pattern including the decelerated approach from the rush cruise. In this case, the accuracy of the deceleration prediction information is reduced.

In the second step, the rank A is compared with the rank B to solve the problems. In the second step, the deceleration start position distribution in the traveling pattern with the rank A is compared with the distribution of the action before approach in the traveling pattern with the rank B. When the deceleration start position distribution in the traveling pattern with the rank A is closer to the stop position than the distribution of the action before approach in the traveling pattern with the rank B, the ranks are maintained. However, when the distribution of the action before approach in the traveling pattern with the rank B is closer to the stop position than the deceleration start position distribution in the traveling pattern with the rank A, the ranks are changed depending on the rate of the frequency of execution of the traveling pattern from the basic cruise.

Specifically, the reliability is set before the learning result is registered. First, the ITSECU 5 sets the exceptional rank to the exceptional pattern in which there is no block before approach. In the traveling patterns other than the exceptional pattern, the ITSECU 5 compares the positions of the deceleration start position distributions in the four traveling patterns using the deceleration start position information of the decelerated approaches of the four traveling patterns stored in the database 5b and sets the reliability ranks such that a higher rank is given to the deceleration start position distribution closer to the area entrance position. In this embodiment, as described above, since the traveling pattern from the basic cruise has the earliest decelerated approach start time, the rank A is set to the traveling pattern from the basic cruise. For three other traveling patterns, the deceleration start position distributions are compared with each other and the reliabilities are set to the traveling patterns according to the comparison result. Therefore, in the first step, the rank A is set to the traveling pattern from the basic cruise.

Then, the ITSECU 5 compares the position of the deceleration start position distribution in the traveling pattern with the rank A with the position of the distribution of the action before approach in the traveling pattern with the rank B, using the deceleration start position information of the decelerated approach of the traveling pattern (traveling pattern from the basic cruise) with the rank A and the position information of the block before approach of the traveling pattern with the rank B which are stored in the database 5b. When the deceleration start position distribution in the traveling pattern with the rank A is closer to the stop position than the distribution of the action before approach in the traveling pattern with the rank B, the ITSECU 5 maintains the reliability ranks according to the comparison between the positions of the deceleration start position distributions. On the other hand, when the distribution of the action before approach in the traveling pattern with the rank B is closer to the stop position than the deceleration start position distribution of the traveling pattern with the rank A, the ITSECU 5 sets the reliability rank on the basis of the ratio of the frequency of execution of the traveling pattern with the rank B with the frequency of execution of the traveling pattern from the basic cruise, using the number of stops in each traveling pattern stored in the database 5b (when the following conditions are satisfied, the rank A and the rank B are reversed). In general, the traveling pattern with high frequency of execution in each area is an operation pattern which is frequently used by the driver in the area and is likely to be the driving operation habit of the driver.

When the ratio of the frequency of execution of the traveling pattern with the rank B from the rush cruise to the frequency of execution of the traveling pattern from the basic cruise (=the number of executions of the traveling pattern from the rush cruise/the number of executions of the traveling pattern from the basic cruise) is equal to or greater than 1.0 (the traveling pattern occurs at a frequency of 1 or more), the rank of the traveling pattern from the rush cruise is changed to the rank A. Since the traveling pattern from the rush cruise is close to the habit of the driver, a low ratio of 1.0 is set as the condition. When the ratio of the frequency of execution of the traveling pattern with the rank B from the disturbance deceleration to the frequency of execution of the traveling pattern from the basic cruise (=the number of executions of the traveling pattern from the disturbance deceleration/the number of executions of the traveling pattern from the basic cruise) is equal to or greater than 2.0 (the traveling pattern occurs at a frequency of 2 or more), the rank of the traveling pattern from the disturbance deceleration is changed to the rank A. Since the traveling pattern from the disturbance deceleration is affected by disturbance, a high ratio of 2.0 is set as the condition. When the ratio of the frequency of execution of the traveling pattern with the rank B from the rush cruise and disturbance deceleration to the frequency of execution of the traveling pattern from the basic cruise (=the number of executions of the traveling pattern from the rush cruise and disturbance deceleration/the number of executions of the traveling pattern from the basic cruise) is equal to or greater than 3.0 (the traveling pattern occurs at a frequency of 3 or more), the rank of the traveling pattern from the rush cruise and disturbance deceleration is changed to the rank A. Since the traveling pattern from the rush cruise and disturbance deceleration is greatly affected by disturbance, a high ratio of 3.0 is set as the condition.

When the position of the deceleration start position distribution or the distribution of the action before approach is compared, for example, the average position of the distribution is calculated and the position is compared with the average position or the position which is furthest from the stop position in the distribution.

Figure 15:
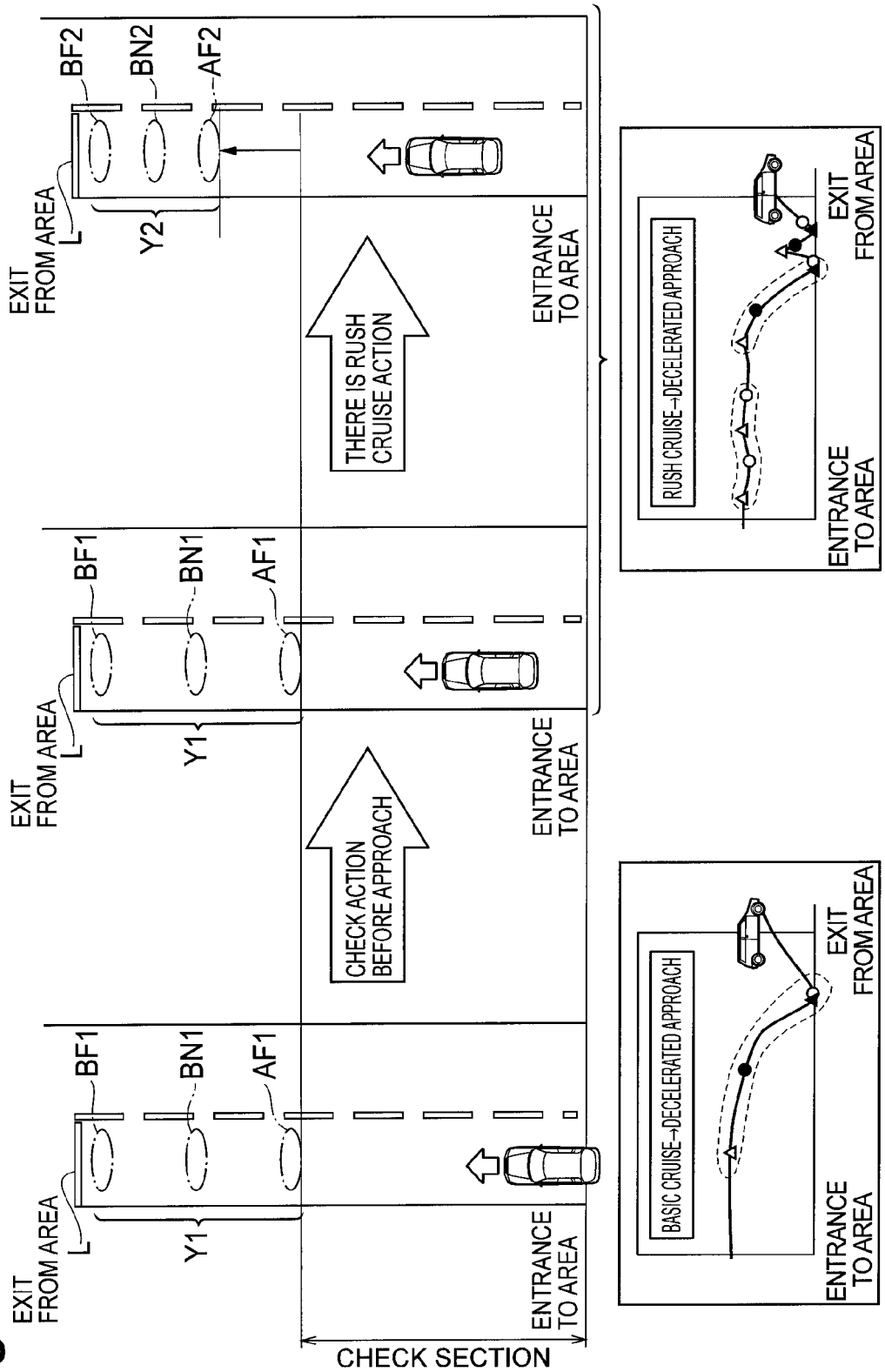
FIG. 15 is a diagram illustrating a deceleration predicting process of a general traveling pattern according to this embodiment.
Figure 16:
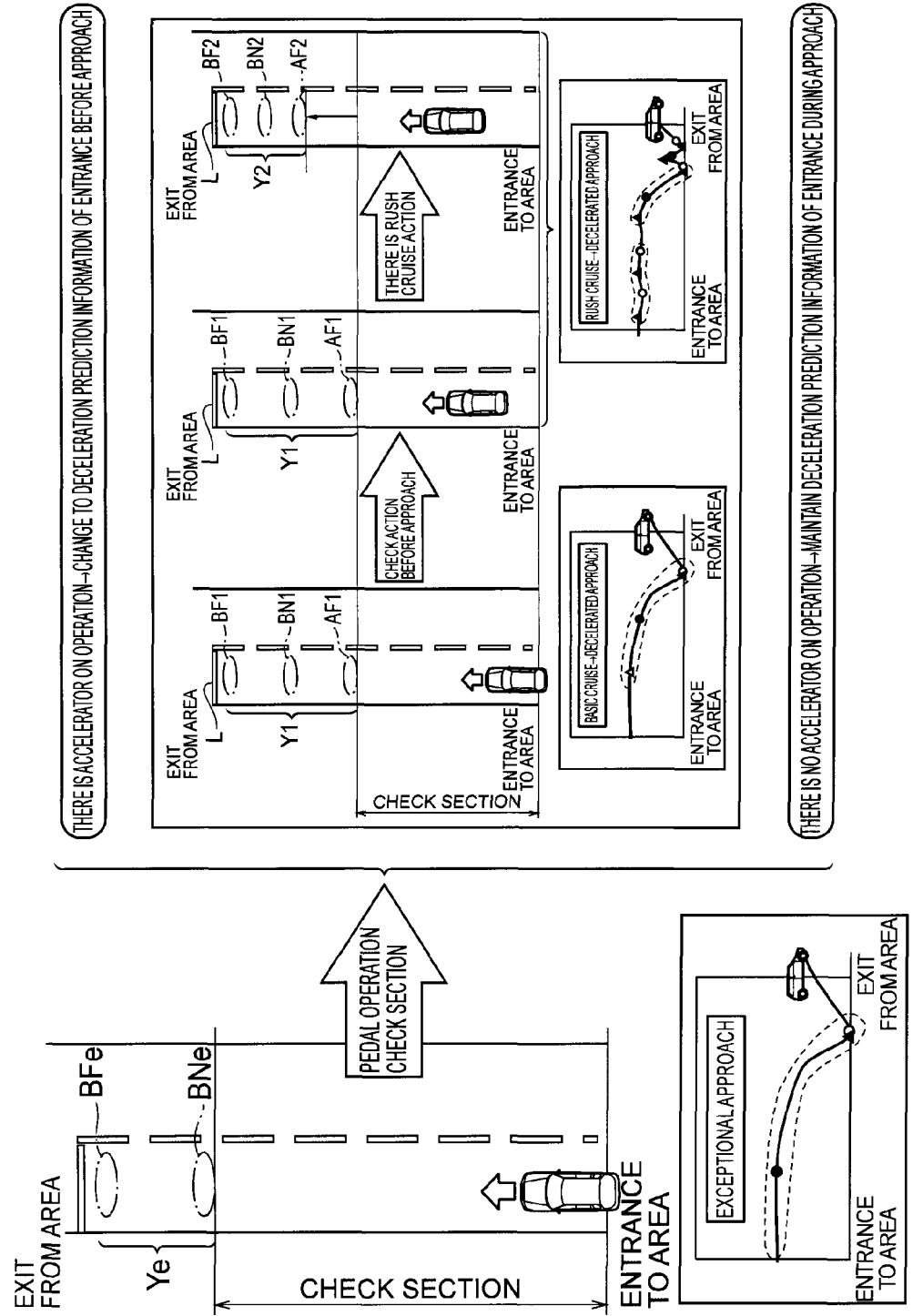
FIG. 16 is a diagram illustrating a deceleration predicting process of an exceptional pattern according to this embodiment.

Next, deceleration prediction will be described with reference to FIGS. 15 to 18. FIG. 15 is a diagram illustrating the deceleration predicting process of the general traveling pattern. FIG. 16 is a diagram illustrating the deceleration predicting process of the exceptional pattern. FIG. 17 shows a decision table used in a determining and predicting process during entrance to an area. FIG. 18 is a decision table used in a determining and predicting process after entrance to an area.

In the deceleration prediction, in the case of the entrance before approach, as shown in FIG. 15, when the vehicle enters the support area, the deceleration prediction information of the traveling pattern with the reliability rank A is output and the traveling pattern is determined on the basis of the pedal operation performed in the check section for the action before approach. When the traveling pattern other than the traveling pattern with the rank A is determined, the deceleration prediction information of the traveling pattern is changed to the deceleration prediction information of the determined travel pattern and the changed deceleration prediction information is output. In the case of the entrance during approach, as shown in FIG. 16, when the vehicle enters the support area, the deceleration prediction information of the exceptional pattern with the reliability of the exceptional rank is output. When the accelerator ON operation is performed in the check section for the action before approach, prediction is changed to deceleration prediction for the entrance before approach. Then, similarly to the above, the deceleration prediction information of the traveling pattern of the entrance before approach is output. When the accelerator ON operation is not performed, the exceptional rank is maintained and the deceleration prediction information of the traveling pattern with the exceptional rank is continuously output.

Next, the deceleration predicting process of the ITSECU 5 will be described in detail. When it is determined by the above-mentioned process that the vehicle enters the candidate area and the candidate area is specified as the support area, the ITSECU 5 performs the deceleration predicting process at a predetermined time interval or at intervals of a predetermined traveling distance, on the basis of the information about the support area registered in the database 5b. In the deceleration predicting process, the determining and predicting process during entrance to an area, the determining and predicting process after entrance to an area, and a prediction result registration process are performed.

The determining and predicting process during entrance to an area will be described. The ITSECU 5 determines one of the entrance before approach and the entrance during approach on the basis of the state of the pedal when the vehicle enters the support area, according to the determination conditions of the decision table shown in FIG. 17. The state of the pedal includes the operation state (stepping-on the accelerator and stepping-on the brake) of the brake pedal or the accelerator pedal and a state (no pedal operation) in which the pedal is not operated. When the state of the pedal is an accelerator ON state, the ITSECU 5 determines the entrance before approach since there is no entrance during approach. When the state of the pedal is a brake ON state, the ITSECU 5 preferentially determines the entrance during approach. When the state of the pedal is the state in which no petal operation is performed, the ITSECU 5 preferentially determines the entrance during approach.

In the case in which the entrance during approach is determined by the above-mentioned determining process, when it is determined that there is no traveling result on the basis of the traveling results (for example, the number of passages and the number of stops) of the traveling pattern of the entrance during approach in the support area registered in the database 5b, the ITSECU 5 changes the entrance type to the entrance before approach. In the case in which the entrance before approach is determined by the above-mentioned determining process, when it is determined that there is no traveling result on the basis of the traveling results (for example, the number of passages and the number of stops) of the traveling pattern of the entrance before approach in the support area registered in the database 5b, the ITSECU 5 forcibly ends the deceleration predicting process. In this case, no deceleration prediction information is output.

When the entrance before approach is determined during the entrance of the vehicle to the support area, the ITSECU 5 outputs the deceleration prediction information of the traveling pattern with the reliability rank A in the support area which is registered in the database 5b and sets the check section. In addition, when the entrance during approach is determined during the entrance of the vehicle to the support area, the ITSECU 5 outputs the deceleration prediction information of the traveling pattern with the exceptional rank in the support area which is registered in the database 5b and sets the check section.

The check section is for checking the traveling pattern before the decelerated approach. The start position of the check section is the entrance position of the support area. In the entrance before approach, the end position of the check section is set using the traveling pattern with the reliability rank A. When the traveling pattern of the decelerated approach from the basic cruise has the reliability rank A, the accelerator OFF position (deceleration start position) learned by the decelerated approach is set. In the traveling pattern of the decelerated approach from the rush cruise, the accelerator ON position (the position of the first pedal operation capable of determining the rush cruise) of the acceleration action learned by the block before approach. In the traveling pattern of the decelerated approach from the disturbance deceleration, the brake ON position (the position of the first pedal operation capable of determining the disturbance deceleration) of the deceleration action learned by the block before approach is set. In the traveling pattern of the decelerated approach from the rush cruise and disturbance deceleration, the accelerator ON position of the acceleration action or the brake ON position (the position of the first pedal operation capable of determining the rush cruise and disturbance deceleration) of the deceleration action learned by the block before approach is set. In the entrance during approach, the brake ON position (brake start position) of the exceptional approach is set as the end position of the check section.

Next, the determining and predicting process after entrance to an area will be described. The ITSECU 5 performs the following process at a predetermined time interval or at intervals of a predetermined traveling distance in the check section after the entrance to the area. When it is determined that the entrance to the area is the entrance during approach and a pedal operation is observed in the check section, the ITSECU 5 determines whether to maintain the entrance during approach or to change it to the entrance before approach on the basis of the pedal operation, according to the determination conditions of the decision table shown in FIG. 18. The pedal operation means the time when the brake or accelerator pedal is operated (the time when the accelerator is stepped on or off or the brake is stepped on or off). When a pedal operation of stepping on the accelerator is performed in the check section, the ITSECU 5 changes the entrance to the area from the entrance during approach to the entrance before approach. When a pedal operation of stepping on the brake is performed in the check section, the ITSECU 5 maintains the entrance during approach. When a pedal operation of stepping off the accelerator or the brake is performed in the check section, the ITSECU 5 maintains the entrance during approach.

In the case in which it is determined that the entrance to the area is the entrance before approach or the entrance to the area is changed from the entrance during approach to the entrance before approach, when a pedal operation is observed in the check section, the ITSECU 5 maintains the entrance before approach even in any pedal operation, according to the determination conditions of the decision table shown in FIG. 18. However, when it is determined that there is no traveling result on the basis of the traveling results of the entrance before approach in the support area registered in the database 5b, the ITSECU 5 forcibly ends the deceleration predicting process.

When it is determined that the entrance to the area is the entrance before approach, the ITSECU 5 determines one of the traveling pattern from the basic cruise, the traveling pattern of the rush cruise, the traveling pattern of the disturbance deceleration, the traveling pattern of the rush cruise and disturbance deceleration which is close to the traveling pattern (action before the deceleration approach) after the entrance to the area, on the basis of the information of the pedal operation observed in the check section. When any traveling pattern cannot be determined, the ITSECU 5 maintains the currently predicted traveling pattern (the traveling pattern with the reliability rank A when the vehicle enters the area or the exceptional pattern) and the check section, and continuously outputs the deceleration prediction information of the currently predicted traveling pattern. When any traveling pattern can be determined and the traveling pattern which can be determined is the same as the currently predicted traveling pattern, the ITSECU 5 maintains the currently predicted traveling pattern and the check section, and continuously outputs the deceleration prediction information of the currently predicted traveling pattern. When any traveling pattern can be determined and the traveling pattern which can be determined is different from the currently predicted traveling pattern, the ITSECU 5 changes prediction to the prediction of the determinable traveling pattern, changes the deceleration prediction information to the deceleration prediction information of the determinable traveling pattern registered in the database 5b, and outputs the changed deceleration prediction information. In addition, the ITSECU 5 changes the end position of the check section. The change in the end position of the check section is set by the same method as described above, according to the determinable traveling pattern.

After the vehicle enters the support area, the ITSECU 5 determines whether the vehicle reaches the end position of the set check section whenever the current position information is received from the navigation system 3. When it is determined that the vehicle does not reach the end position of the check section, the ITSECU 5 repeatedly performs the determining and predicting process after entrance to an area. When it is determined that the vehicle reaches the end position of the check section, the ITSECU 5 ends the determining and predicting process after entrance to an area.

Next, the prediction result registration process will be described. At the time when the check section ends, the ITSECU 5 registers the current prediction result in the database 5b. Examples of the prediction result include the finally predicted traveling pattern and the deceleration prediction information of the traveling pattern.

In the example shown in FIG. 15, in some cases, when the vehicle enters the support area, the entrance to the area is determined to be the entrance before approach and the traveling pattern of the decelerated approach from the basic cruise has the reliability rank A. In this case, at the time when the vehicle enters the support area, deceleration prediction information Y1 (a deceleration start position AF1, a brake start position BN1, and a stop target position BF1) of the traveling pattern of the basic cruise is output. Even when any pedal operation is performed during the traveling of the vehicle in the check section, the entrance before approach is maintained. In particular, in this example, during the traveling of the vehicle in the check section, deceleration prediction information Y2 (a deceleration start position AF2, a brake start position BN2, and a stop target position BF2) of the traveling pattern of the rush cruise is output since it is determined that the traveling pattern is close to the traveling pattern of the rush cruise from the pedal operation information. Since the positions AF2, BN2, and BF2 in the deceleration prediction information Y2 of the traveling pattern of the rush cruise is closer to the temporary stop line L than the positions AF1, BN1, and BF1 in the deceleration prediction information Y1 of the traveling pattern of the basic cruise, it is possible to accurately perform an eco-driving support suitable for the driving pattern of the driver at that time, using the positions AF2, BN2, and BF2.

In the example shown in FIG. 16, in some cases, when the vehicle enters the support area, the entrance to the area is determined to be the entrance during approach and the driving pattern is the exceptional pattern with the exceptional rank. In this case, when the vehicle enters the support area, deceleration prediction information Ye (a brake start position BNe and a stop target position BFe) of the exceptional pattern is output. When an accelerator ON operation is observed as the pedal operation during the traveling of the vehicle in the check section, the entrance to the area is changed to the entrance before approach and the deceleration prediction information is changed to the deceleration prediction information of the entrance before approach shown in FIG. 15. When an accelerator ON operation is not observed as the pedal operation during the traveling of the vehicle in the check section, the entrance during approach is maintained and the deceleration prediction information Ye of the exceptional pattern is continuously output. As such, even when the accelerator OFF operation for the decelerated approach is performed before the vehicle enters the support area, it is possible to predict deceleration, output the prediction information of the brake start position BNe or the stop target position BFe, and perform the eco-driving support suitable for the driving pattern of the driver at that time.

The HVECU 6 is an electronic control unit including, for example, a CPU, a ROM, and a RAM and controls an engine and a motor (inverter) which are driving sources of a hybrid vehicle and a brake which is a braking source. Next, among the functions of the HVECU 6, only an eco-driving support function using the deceleration prediction information corresponding to the traveling pattern from the ITSECU 5 will be described. Examples of the eco-driving support when the hybrid vehicle decelerated and stopped include a reduction in fuel consumption and power consumption by the adjustment of the pressure of the accelerator pedal in the accelerator OFF operation, an increase in power collected by a change in a regeneration brake amount, and a reduction in fuel consumption and power consumption by engine stop.

The HVECU 6 determines whether the vehicle enters the support area during the traveling of the vehicle whenever the current position information is received from the navigation system 3. When it is determined that the vehicle has entered the support area, the HVECU 6 provides information for prompting the driver to perform an accelerator OFF operation earlier than usual at the position in front of the deceleration start position, on the basis of the deceleration start position in the deceleration prediction information. In the provision of the information, for example, a direct or indirect message indicating "When stepping off the accelerator now, you can reduce fuel consumption" is displayed on a screen or is output as a voice, or the information is transmitted to the driver by, for example, the vibration of the accelerator pedal. When the driver performs the accelerator OFF operation in the support area, the HVECU 6 controls the motor (inverter) or the brake on the basis of the stop position in the deceleration prediction information such that the regeneration brake amount increases (for example, deceleration increases), or turns off the engine early. The eco-driving support using the deceleration prediction information according to this embodiment is illustrative, and the eco-driving support may be performed by other methods using the deceleration prediction information.

In the case of an automatically-operated vehicle or a vehicle having an ACC function, the vehicle performs acceleration and deceleration control. The vehicle controls the engine, the motor, and the brake at the usual deceleration stop position of the vehicle (driver) on the basis of the usual deceleration stop action of the vehicle (driver), thereby shortening the start time of the accelerator OFF operation, increasing the regeneration brake amount, and stopping the engine on the basis of the deceleration prediction information.

Figure 19:
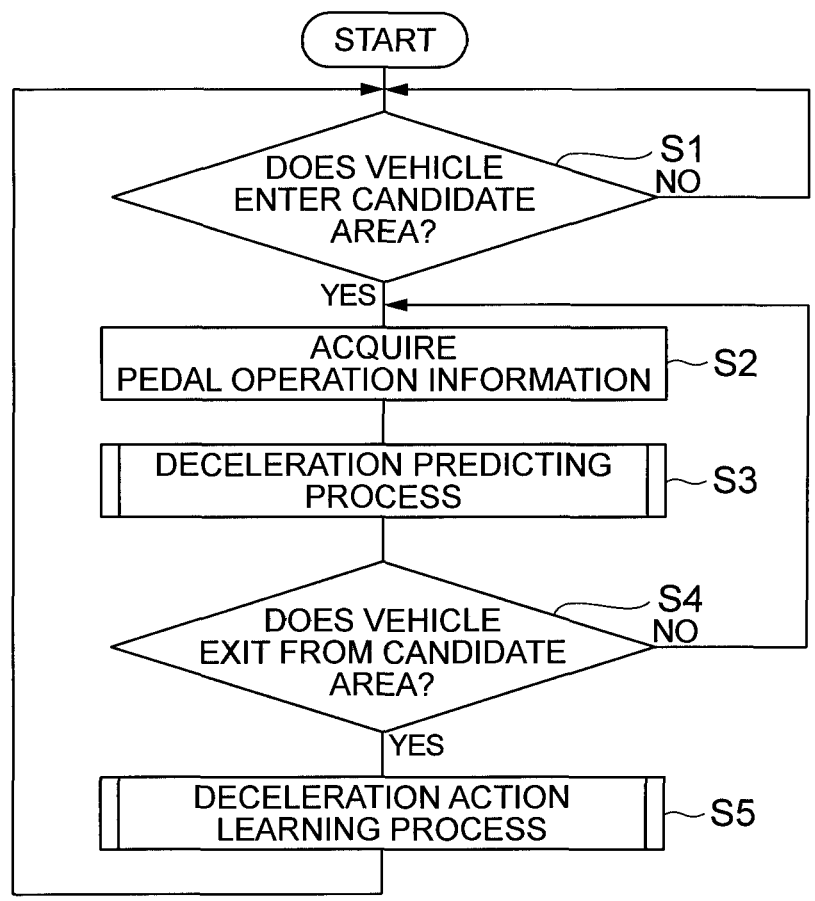
FIG. 19 is a flowchart illustrating the flow of a main process of an ITSECU according to this embodiment.
Figure 20:
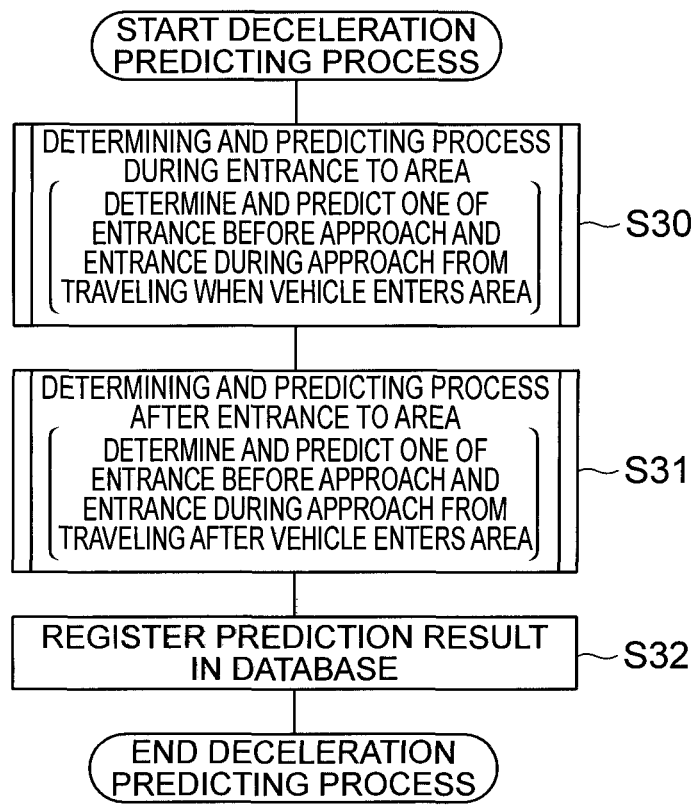
FIG. 20 is a flowchart illustrating the flow of the deceleration predicting process of the ITSECU according to this embodiment.
Figure 21:
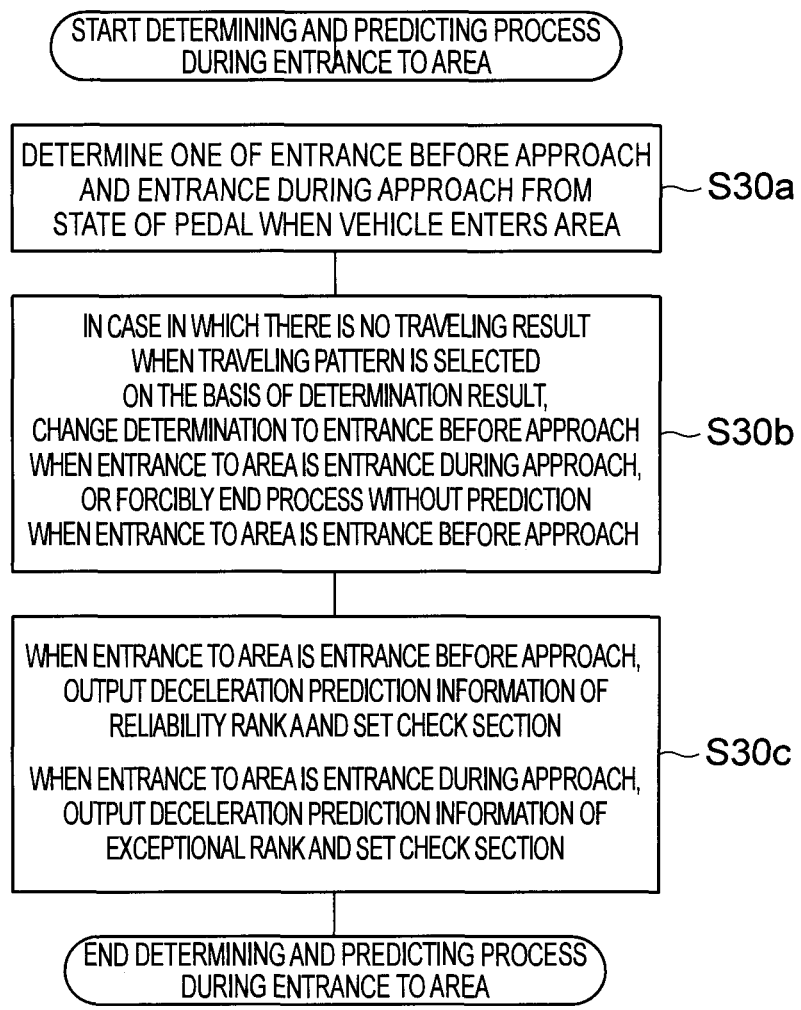
FIG. 21 is a flowchart illustrating the flow of the determining and predicting process during entrance to an area performed by the ITSECU according to this embodiment.
Figure 22:
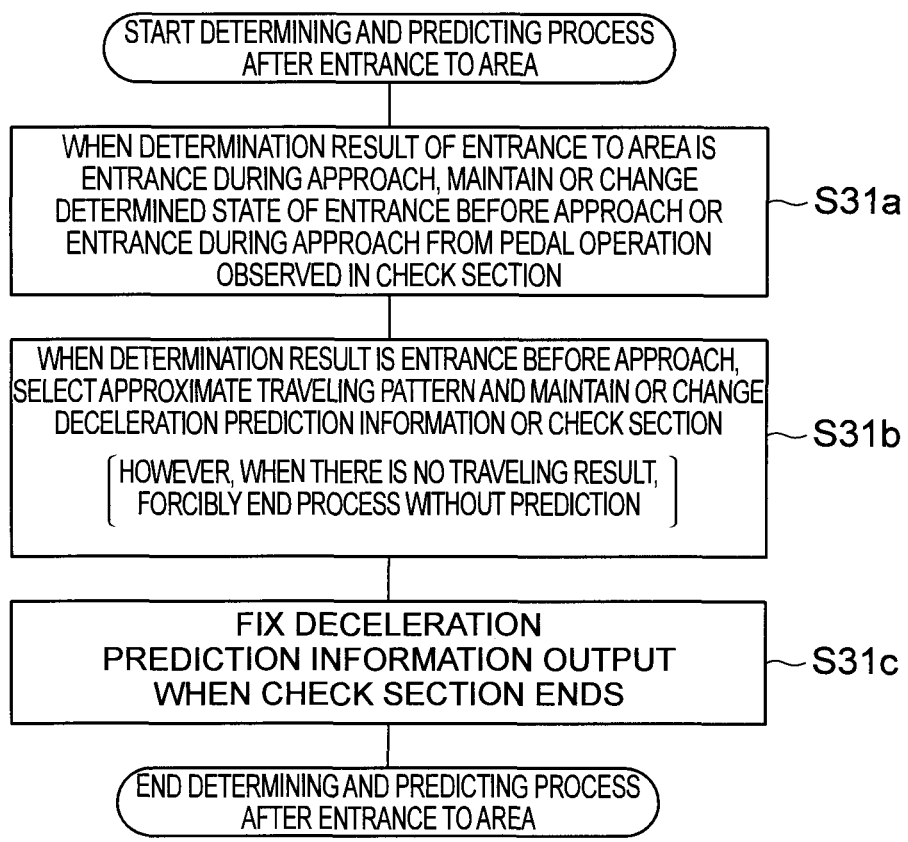
FIG. 22 is a flowchart illustrating the flow of the determining and predicting process after entrance to an area performed by the ITSECU according to this embodiment.
Figure 23:
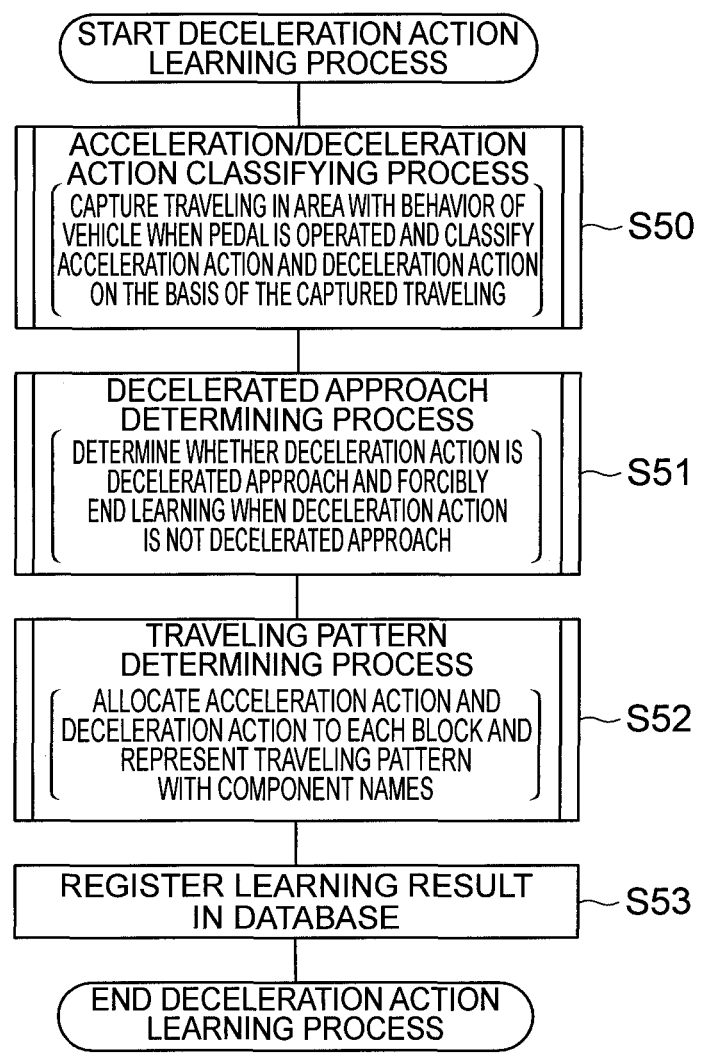
FIG. 23 is a flowchart illustrating the flow of the deceleration action learning process of the ITSECU according to this embodiment.
Figure 24:
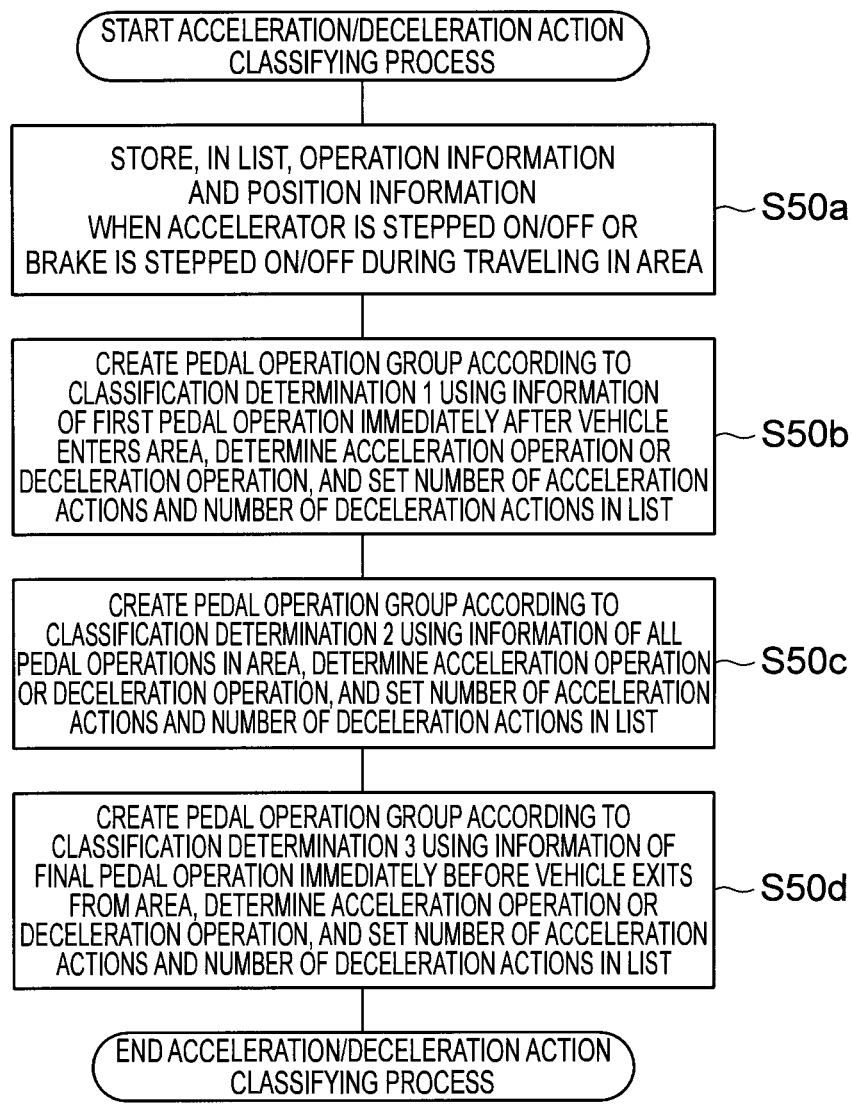
FIG. 24 is a flowchart illustrating the flow of the acceleration/deceleration action classifying process of the ITSECU according to this embodiment.
Figure 25:
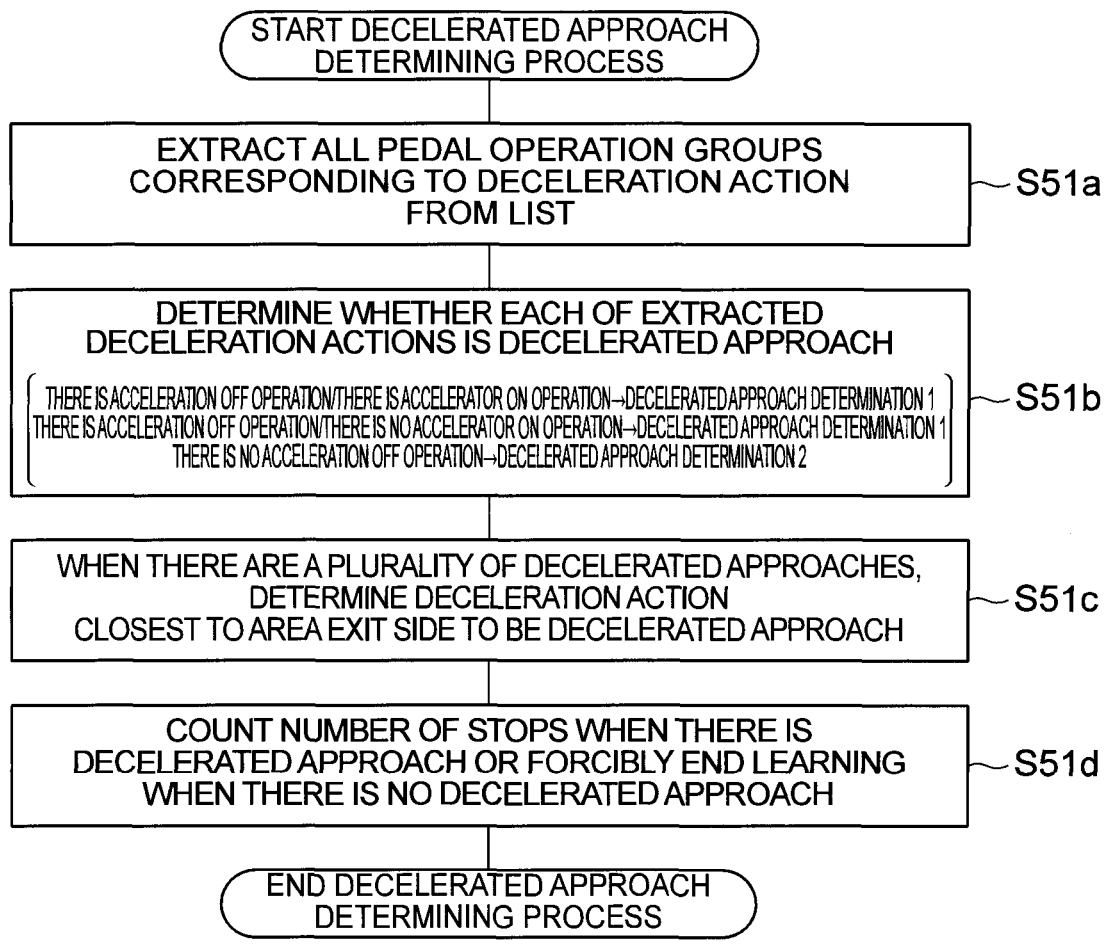
FIG. 25 is a flowchart illustrating the flow of the decelerated approach determining process of the ITSECU according to this embodiment.
Figure 26:
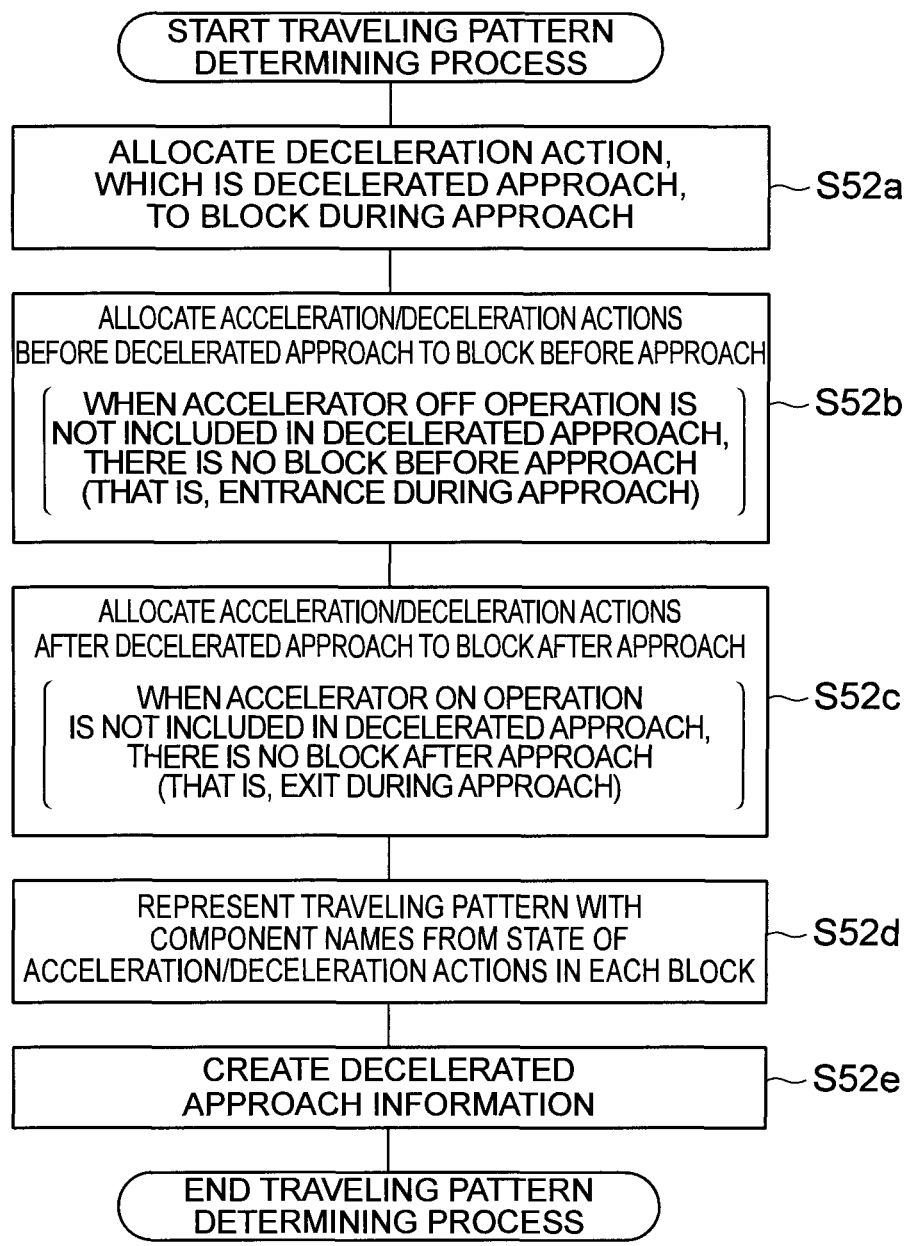
FIG. 26 is a flowchart illustrating the flow of the traveling pattern determining process of the ITSECU according to this embodiment.

Next, the operation of the information processing system 1 for a vehicle will be described with reference to FIG. 1. In particular, the main process of the ITSECU 5 will be described with reference to the flowchart shown in FIG. 19, the deceleration predicting process will be described with reference to the flowcharts shown in FIGS. 20 to 22, and the deceleration action learning process will be described with reference to the flowcharts shown in FIGS. 23 to 26. FIG. 19 is a flowchart illustrating the flow of the main process. FIG. 20 is a flowchart illustrating the flow of the deceleration predicting process. FIG. 21 is a flowchart illustrating the flow of the determining and predicting process during entrance to an area. FIG. 22 is a flowchart illustrating the flow of the determining and predicting process after entrance to an area. FIG. 23 is a flowchart illustrating the flow of the deceleration action learning process. FIG. 24 is a flowchart illustrating the flow of the acceleration/deceleration action classifying process. FIG. 25 is a flowchart illustrating the flow of the decelerated approach determining process. FIG. 26 is a flowchart illustrating the flow of the traveling pattern determining process.

The road-to-vehicle communication device 2 receives, for example, road alignment information to an intersection, which is a service target, the information of the intersection, and signal cycle information from the infrastructure whenever the vehicle enters a communication area of the infrastructure and transmits necessary information among the received information items to the ITSECU 5. Whenever detecting the current position on the basis of, for example, GPS signals, the navigation system 3 transmits the information of the current position and map information about the vicinity of the current position to the ITSECU 5. The ITSECU 5 acquires, for example, pedal operation information and vehicle speed information from the CAN 4.

The ITSECU 5 determines whether the vehicle passes through the position where the vehicle is predicted to be stopped (the section in which a decelerate operation is predicted to be frequently performed) on the basis of the map information whenever the current position information is received during the traveling of the vehicle. When the vehicle passes through the position where the vehicle is predicted to be stopped, the ITSECU 5 sets the candidate area on the basis of the information of the position. Alternatively, the ITSECU 5 stores the pedal operation information and the current position information in the database 5a so as to be associated with each other, at a predetermined time interval or at intervals of a predetermined traveling distance during the traveling of the vehicle. Then, the ITSECU 5 extracts the deceleration action from the pedal operation information stored in the database 5a, determines the section in which the deceleration action is frequently performed, and sets the section as the candidate area.

When the candidate area is set, the ITSECU 5 determines whether the vehicle enters the candidate area on the basis of the current position information whenever the current position information is received during the traveling of the vehicle (S1). When it is determined in Step S1 that the vehicle does not enter the candidate area, the ITSECU 5 waits until the next current position information is received and determines whether the vehicle enters the candidate area again (S1).

When it is determined in Step S1 that the vehicle has entered the candidate area, the ITSECU 5 acquires the pedal operation information and the vehicle behavior information (for example, the vehicle speed information) from the CAN 4 whenever the current position information is received (or at a predetermined time interval or whenever stepping-on/stepping off the pedal are detected) and stores the pedal operation information, the current position information, and the vehicle behavior information as the data of the candidate area which the vehicle is currently entering in the database 5b so as to be associated with each other (S2). When the candidate area is specified as the support area, the ITSECU 5 performs the deceleration predicting process (S3).

At the time when the vehicle enters the support area, the ITSECU 5 performs the determining and predicting process during entrance to an area (S30). First, the ITSECU 5 determines whether the entrance to the area is the entrance before approach or the entrance during approach on the basis of the state of the pedal at the time when the vehicle enters the support area (S30a).

In the case in which it is determined in Step S30a that the entrance to the area is the entrance during approach, when it is determined that there is no traveling result of the traveling pattern of the entrance during approach on the basis of the information of the support area registered in the database 5b, the ITSECU 5 changes the determination to the entrance before approach (S30b). In the case in which it is determined in Step S30a that the entrance to the area is the entrance before approach, when it is determined that there is no traveling result of the traveling pattern of the entrance before approach on the basis of the information of the support area registered in the database 5b, the ITSECU 5 forcibly ends the deceleration predicting process (S30b).

When it is determined that the entrance to the area is the entrance before approach, the ITSECU 5 outputs the deceleration prediction information of the traveling pattern with the reliability rank A which is registered in the database 5b to the HVECU 6, and sets the check section (in particular, the end position) on the basis of the pedal operation position information of the traveling pattern with the reliability rank A (S30c). When it is determined that the entrance to the area is the entrance during approach, the ITSECU 5 outputs the deceleration prediction information of the exceptional pattern with the exceptional rank which is registered in the database 5b to the HVECU 6, and sets the check section (in particular, the end position) on the basis of the pedal operation position information of the exceptional pattern (S30c).

The ITSECU 5 performs the determining and predicting process after entrance to an area at a predetermined time interval or at intervals of a predetermined distance until the check section ends after entrance to the support area (S31). First, when it is determined that the entrance to the area is the entrance during approach, the ITSECU 5 determines whether to maintain the entrance during approach or change the entrance to the area to the entrance before approach on the basis of the observed pedal operation (S31a). In this embodiment, only when the accelerator ON operation is observed, the entrance to the area is changed to the entrance before approach. In the other cases, the entrance during approach is maintained.

When it is determined that the entrance to the area is the entrance before approach or when the entrance during approach is changed to the entrance before approach, the ITSECU 5 selects an approximate traveling pattern from the traveling pattern of the basic cruise, the traveling pattern of the rush cruise, the traveling pattern of the disturbance deceleration, and the traveling pattern of the rush cruise and disturbance deceleration, on the basis of the information of the pedal operation observed in the check section (S31b). When the selected traveling pattern is the same as the currently predicted traveling pattern, the ITSECU 5 maintains the currently predicted traveling pattern and the check section, and continuously outputs the deceleration prediction information of the currently predicted traveling pattern to the HVECU 6 (S31b). When the selected traveling pattern is different from the currently predicted traveling pattern, the ITSECU 5 changes prediction to the selected traveling pattern, changes the end position of the check section on the basis of the pedal operation position information of the changed traveling pattern, changes the deceleration prediction information to the deceleration prediction information of the changed traveling pattern, and outputs the changed deceleration prediction information to the HVECU 6 (S31*b*). When it is determined that there is no traveling result of the traveling pattern of the entrance before approach on the basis of the information of the support area registered in the database 5*b*, the ITSECU 5 forcibly ends the deceleration predicting process (S31*b*).

Then, after the vehicle enters the support area, the ITSECU 5 determines whether the vehicle reaches the end position of the set check section whenever the current position information is received from the navigation system 3 (S31*c*). When it is determined that the vehicle reaches the end position of the check section, the ITSECU 5 ends the determining and predicting process after entrance to an area and fixes the output deceleration prediction information (S31*c*). At the time when the check section ends, the ITSECU 5 registers the current prediction result in the database 5*b* (S32).

In addition, after the vehicle enters the support area, the ITSECU 5 determines whether the vehicle exits from the candidate area on the basis of the current position information whenever the current position information is received from the navigation system 3 (S4). When it is determined in Step S4 that the vehicle does not exit from the candidate area, the ITSECU 5 returns to Step S2. When it is determined in Step S4 that the vehicle has exited from the candidate area, the ITSECU 5 counts the number of times the vehicle passes through the candidate area and proceeds to the deceleration action learning process (S5).

First, the ITSECU 5 performs the acceleration/deceleration action classifying process (S50). For example, the ITSECU 5 stores, in the list, pedal operation information and vehicle position information when the accelerator is stepped on/off or the brake is stepped on/off during the traveling of the vehicle in the candidate area, using the current traveling information of the vehicle in the candidate area which is registered in the database 5*b* (S50*a*).

Then, the ITSECU 5 creates a pedal operation group according to classification determination 1 using the information of the first pedal operation immediately after the vehicle enters the candidate area, which is stored in the list, and determines an acceleration action or a deceleration action. When the acceleration action or the deceleration action can be determined, the ITSECU 5 sets the number of acceleration actions and the number of deceleration actions in the list (S50*b*). In some cases, the acceleration action and the deceleration action cannot be determined.

Then, the ITSECU 5 creates a pedal operation group according to classification determination 2 using the information of all pedal operations in the candidate area which is stored in the list, and determines an acceleration action or a deceleration action. When the acceleration action or the deceleration action can be determined, the ITSECU 5 sets the number of acceleration actions and the number of deceleration actions in the list (S50*c*). In some cases, the acceleration action and the deceleration action cannot be determined.

When the acceleration action and the deceleration action cannot be determined in each of Steps S50*b* and S50*c*, that is, when it is determined that an acceleration action or a deceleration action is being performed, the ITSECU 5 creates a pedal operation group according to classification determination 3 using the information of the final pedal operation immediately before the vehicle exits from the candidate area which is stored in the list and determines an acceleration action or a deceleration action. When the acceleration action or the deceleration action can be determined, the ITSECU 5 sets the number of acceleration actions and the number of deceleration actions in the list (S50*d*). When the acceleration/deceleration action classifying process ends, the ITSECU 5 proceeds to the decelerated approach determining process (S51).

When proceeding to the decelerated approach determining process, the ITSECU 5 extracts the pedal operation group of the classified deceleration action from the list (S51*a*). When there are a plurality of deceleration actions, the ITSECU 5 extracts all of the deceleration actions.

The ITSECU 5 determines whether each of the extracted deceleration actions is the decelerated approach (S51*b*). When there is an accelerator OFF operation in the deceleration action, it is determined whether the deceleration action is the decelerated approach on the basis of decelerated approach determination 1 using the vehicle speed when the accelerator is stepped off and the vehicle speed when the brake is stepped off. When the accelerator OFF operation is not included in the deceleration action, it is determined whether the deceleration action is the decelerated approach on the basis of decelerated approach determination 2 using the vehicle speed when the brake is stepped on and the vehicle speed when the brake is stepped off. When it is determined that there are a plurality of decelerated approaches, the ITSECU 5 determines the deceleration action close to the exit side of the candidate area to be the decelerated approach (S51*c*).

When it is determined that there is a decelerated approach in the candidate area, the ITSECU 5 counts the number of stops (S51*d*). When it is determined that there is no decelerated approach in the candidate area, the ITSECU 5 forcibly ends the deceleration action learning process (S51*d*). Then, the ITSECU 5 proceeds to the traveling pattern determining process (S52).

When proceeding to the traveling pattern determining process, the ITSECU 5 allocates the deceleration action, which is the decelerated approach, to the block during approach (S52*a*). In addition, the ITSECU 5 allocates the acceleration and deceleration actions before the decelerated approach to the block before approach (S52*b*). At that time, when no accelerator OFF operation is included in the decelerated approach (entrance during approach), the ITSECU 5 determines that there is no block before approach. The ITSECU 5 allocates the acceleration and deceleration actions after the decelerated approach to the block after approach (S52*c*). At that time, when no accelerator ON operation is included in the decelerated approach (exit during approach), the ITSECU 5 determines that there is no block after approach.

Then, the ITSECU 5 identifies the component names (traveling patterns in each block) from the pedal operation group of the acceleration and deceleration actions in each block and represents the traveling patterns in the candidate area with the component names in each block (S52*d*). In addition, the ITSECU 5 creates decelerated approach information for the traveling patterns in the candidate area (S52*e*).

When sufficient traveling results to set the reliability of the candidate area are stored in the database 5*b*, the ITSECU 5 compares the positions of the deceleration start position distributions of the four traveling patterns (the traveling pattern of the decelerated approach from the basic cruise, the traveling pattern of the decelerated approach from the rush cruise, the traveling pattern of the decelerated approach from the disturbance deceleration, and the traveling pattern of the decelerated approach from the rush cruise and disturbance deceleration), on the basis of the deceleration start position information of the four traveling patterns which has been stored in the database 5*b* for the candidate area until now, and sets the reliability rank such that a higher reliability rank is given to the traveling pattern in which the deceleration start position distribution is closer to the area entrance position. In addition, the ITSECU 5 compares the position of the deceleration start position distribution of the traveling pattern with the rank A with the position of the distribution of the action before approach in the traveling pattern with the rank B, on the basis of the deceleration start position information and execution frequency information of the traveling pattern with the rank A and the operation position information and execution frequency information of the action before approach of the traveling pattern with the rank B which have been stored in the database 5b for the candidate area until now. When the distribution of the action before approach in the traveling pattern with the rank B is closer to the stop position than the deceleration start position distribution of the traveling pattern with the rank A, the ITSECU 5 reverses the ranks A and B only when the above-mentioned conditions are satisfied on the basis of the ratio of the frequency of execution of the traveling pattern to the frequency of execution of the basic pattern. When the information of the exceptional pattern for the candidate area is stored in the database 5b, the ITSECU 5 sets the exceptional rank to the exceptional pattern.

When the number of times the vehicle passes through the candidate area is equal to or greater than a predetermined value and the stop rate is equal to or greater than a threshold value, the ITSECU 5 specifies the candidate area as the support area. The ITSECU 5 registers the learning result of the current traveling in the candidate area in the database 5b (S53). Then, the ITSECU 5 ends the deceleration action learning and returns to Step S1.

When the deceleration prediction information is input from the ITSECU 5, the HVECU 6 performs, for example, information provision and vehicle control for the eco-driving support, on the basis of the usual deceleration start position, usual brake start position, and usual stop target position of the vehicle (furthermore, the driver of the vehicle) in the current traveling pattern in the support area.

According to the information processing system 1 for a vehicle (in particular, the ITSECU 5), even when an accelerator OFF operation is not performed in the candidate area, the operation is classified as a deceleration action and can be specified as the traveling pattern (in particular, the exceptional approach) of the decelerated approach. Therefore, it is possible to set the decelerated approach information (deceleration prediction information) to the traveling pattern and perform a high-accuracy driving support suitable for the driver. In addition, according to the information processing system 1 for a vehicle, even when an accelerator ON operation is not performed in the candidate area, the operation is classified as the deceleration action and can be specified as the traveling pattern of the decelerated approach. Therefore, it is possible to set the decelerated approach information to the traveling pattern and perform a high-accuracy driving support suitable for the driver. That is, even when the accelerator OFF operation of the decelerated approach is performed before the vehicle enters the area or even when the accelerator ON operation of the decelerated approach is performed after the vehicle exits from the area by, for example, the driving operation habit of the driver, disturbance during the traveling of the vehicle, and the shape of the road, it is possible to learn the operation as a support target and predict the operation. In addition, an eco-driving support opportunity increases.

According to the information processing system 1 for a vehicle, the entrance to the area is classified into the entrance before approach in which the accelerator OFF operation is included in the decelerated approach and the entrance during approach in which the accelerator OFF operation is not included in the decelerated approach. In the entrance before approach, the reliability ranks A to D are given to four traveling patterns. In the entrance during approach, the reliability of the exceptional rank is given. In this way, when deceleration prediction is performed, it is possible to simply perform the prediction with high accuracy, on the basis of the reliability corresponding to the entrance before approach or the entrance during approach and output high-accuracy deceleration support information. Furthermore, according to the information processing system 1 for a vehicle, even when the traveling pattern is predicted as the exceptional pattern of the entrance during approach during entrance to the area, it is possible to change the traveling pattern to the traveling pattern of the entrance before approach on the basis of a pedal operation after the vehicle enters the area. Therefore, it is possible to perform prediction with high accuracy.

The embodiment of the invention has been described above, but the invention is not limited to the embodiment. Various embodiments of the invention can be made.

For example, in this embodiment, the vehicle includes the database and performs each learning process. However, the database may be provided in a center which provides various kinds of services to the vehicle and the center may perform each learning process. In this case, it is possible to reduce the memory capacity or processing load of each vehicle. When the database is provided in the center, the vehicle can wirelessly communicate with the center. In this case, the vehicle transmits various kinds of information to be stored in the database to the center and receives, for example, support area prediction information from the center. The database of the center stores the data of all vehicles (drivers), which are support targets. In addition, the center may include the database and each vehicle may perform each learning process. In this case, it is also possible to reduce the memory capacity of the vehicle.

This embodiment is applied to the case in which driving support is performed on deceleration and stop. However, the invention may be applied to a case in which the driving support is performed on start and acceleration. For the start and acceleration, for example, when various traveling patterns are used, it is possible to perform candidate area learning, start and acceleration action learning, and start prediction using the same method as described above. This embodiment is applied to the eco-driving support. However, this embodiment may be applied to other driving support systems.

In this embodiment, the exceptional pattern is a driving pattern (no block before approach) in which the accelerator OFF operation of the decelerated approach is performed before the vehicle enters the area. However, the exceptional pattern may be other patterns in which some driving operations of the general driving operation pattern are performed outside the area.

In this embodiment, only a hardware configuration for implementing the invention and an example of the process by the hardware configuration have been described. However, other hardware configurations or processes for implementing the invention may be used. For example, the navigation ECU, not the ITSECU, may perform each learning process or the prediction process.

In this embodiment, the deceleration prediction information is output at a predetermined time interval until the check section ends after the vehicle enters the support area. However, the deceleration prediction information may be output at other timings. For example, the deceleration prediction information may be output once at the time when the check section ends.

INDUSTRIAL APPLICABILITY

According to the invention, there is provided an information processing system for a vehicle that calculates a recommended position of a driving operation in a predetermined area in which the driving operation is supported. The information processing system for a vehicle specifies a driving operation pattern considering the state of the driving operation over the inside and outside of a predetermined area. In this way, even when some driving operations in a driving operation group included in the driving operation pattern are performed outside the area, it is possible to specify the driving operation pattern, determine the recommended position of the driving operation, and perform a high-accuracy driving support suitable for the driver.

REFERENCE SIGNS LIST

1: INFORMATION PROCESSING SYSTEM FOR VEHICLE
2: ROAD-TO-VEHICLE COMMUNICATION DEVICE
3: NAVIGATION SYSTEM
4: CAN
5: ITSECU
5a, 5b: DATABASE
6: HVECU

The invention claimed is:

1. An information processing system for a vehicle that calculates a recommended position of a driving operation in a predetermined area in which the driving operation is supported, comprising:
   storage means for storing driving operation information of a driver and position information of the vehicle in each predetermined area so as to be associated with each other;
   pattern specifying means for specifying a driving operation pattern of the predetermined area on the basis of the information stored in the storage means; and
   recommended position determining means for determining the recommended position of the driving operation in the predetermined area according to the driving operation pattern specified by the pattern specifying means, on the basis of the information stored in the storage means,
   wherein the pattern specifying means specifies the driving operation pattern on the basis of a group of driving operations, which is included in the driving operation pattern and performed in series in the inside and outside of the predetermined area.

2. The information processing system for a vehicle according to claim 1,
   wherein the pattern specifying means specifies the driving operation pattern, considering a part of the driving operations, which is performed when the vehicle enters the predetermined area.

3. The information processing system for a vehicle according to claim 1,
   wherein the pattern specifying means specifies the driving operation pattern, considering a part of the driving operations, which is performed when the vehicle exits from the predetermined area.

4. The information processing system for a vehicle according to claim 1,
   wherein the pattern specifying means specifies the driving operation pattern as an exception operation pattern when a part of driving operations of a group of driving operations, which is included in a general driving operation pattern including deceleration or acceleration, are not performed in the predetermined area, and
   when the pattern specifying means specifies the driving operation pattern as the exception operation pattern, the recommended position determining means determines the recommended position of the driving operation in the predetermined area according to the exception operation pattern.

5. An information processing system for a vehicle that calculates a recommended position of a driving operation in a predetermined area in which the driving operation is supported, comprising:
   database for storing driving operation information of a driver and position information of a vehicle in each predetermined area so as to be associated with each other; and
   control unit for specifying a driving operation pattern of the predetermined area on the basis of the information stored in the database,
   wherein the control unit determines the recommended position of the driving operation in the predetermined area according to the driving operation pattern specified by the control unit, on the basis of the information stored in the database, and
   the control unit specifies the driving operation pattern on the basis of a group of driving operations, which is included in the driving operation pattern and performed in series in the inside and outside of the predetermined area.

6. The information processing system for a vehicle according to claim 5,
   wherein the control unit specifies the driving operation pattern, considering a part of the driving operations, which is performed when the vehicle enters the predetermined area.

7. The information processing system for a vehicle according to claim 5,
   wherein the control unit specifies the driving operation pattern, considering a part of the driving operations, which is performed when the vehicle exits from the predetermined area.

8. The information processing system for a vehicle according to claim 5,
   wherein the control unit specifies the driving operation pattern as an exception operation pattern when a part of driving operations of a group of driving operations, which is included in a general driving operation pattern including deceleration or acceleration, are not performed in the predetermined area, and
   when the control unit specifies the driving operation pattern as the exception operation pattern, the control unit determines the recommended position of the driving operation in the predetermined area according to the exception operation pattern.

* * * * *